United States Patent
Mori

(10) Patent No.: US 10,117,210 B2
(45) Date of Patent: Oct. 30, 2018

(54) APPARATUS AND METHOD FOR CONTROLLING CONGESTION OF MACHINE-TYPE COMMUNICATION IN A RADIO ACCESS NETWORK

(71) Applicant: FUJITSU LIMITED, Kawasaki-shi, Kanagawa (JP)

(72) Inventor: Masaru Mori, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 116 days.

(21) Appl. No.: 14/949,402

(22) Filed: Nov. 23, 2015

(65) Prior Publication Data

US 2016/0192411 A1   Jun. 30, 2016

(30) Foreign Application Priority Data

Dec. 24, 2014   (JP) .................................. 2014-260328

(51) Int. Cl.
*H04W 4/00*   (2018.01)
*H04W 48/18*   (2009.01)
(Continued)

(52) U.S. Cl.
CPC ........... *H04W 60/00* (2013.01); *H04W 4/005* (2013.01); *H04W 4/70* (2018.02); *H04W 8/06* (2013.01);
(Continued)

(58) Field of Classification Search
CPC ..... H04W 4/0005; H04W 8/06; H04W 48/18; H04W 60/00; H04W 74/002; H04W 74/0833; H04W 84/04
See application file for complete search history.

(56) References Cited

U.S. PATENT DOCUMENTS 6,438,375 B1   8/2002   Müller
8,570,956 B2 *   10/2013   Park .................... H04W 74/006
370/252

(Continued)

FOREIGN PATENT DOCUMENTS

JP    2002-538744 A    11/2002
JP    2005-012335 A    1/2005
(Continued)

OTHER PUBLICATIONS

"LTE Release 12—Taking Another Step Toward the Networked Society" Ericsson White Paper 284, 23/3189, Uen, Jan. 2013, Ericsson.
(Continued)

*Primary Examiner* — Alpus H Hsu
(74) *Attorney, Agent, or Firm* — Arent Fox LLP

(57) ABSTRACT

A base station forms a wireless communication area in a radio access network, and a radio device transmits a connection request to the base station. The radio device sets a specific signal sequence in the connection request. The base station stores an attach request for registering a radio device in the radio access network, and receives the connection request including the specific signal sequence from the radio device located in the wireless communication area. In response to the detection of the specific signal sequence, the base station transmits the attach request to a higher-level network node before receiving, from the radio device, another attach request that is scheduled to be received after the detection of the specific signal sequence.

7 Claims, 18 Drawing Sheets

(51) Int. Cl.

| | | |
|---|---|---|
| *H04W 60/00* | (2009.01) | |
| *H04W 74/08* | (2009.01) | |
| *H04W 4/70* | (2018.01) | |
| *H04W 8/06* | (2009.01) | |
| *H04W 74/00* | (2009.01) | |
| *H04W 84/04* | (2009.01) | |

(52) U.S. Cl.
CPC ......... *H04W 48/18* (2013.01); *H04W 74/002* (2013.01); *H04W 74/0833* (2013.01); *H04W 84/04* (2013.01)

(56) References Cited

U.S. PATENT DOCUMENTS

| | | | | |
|---|---|---|---|---|
| 8,712,459 | B2* | 4/2014 | Lim | H04W 4/005 455/452.1 |
| 8,971,268 | B2* | 3/2015 | Ryu | H04W 4/005 370/329 |
| 9,049,588 | B2* | 6/2015 | Choi | H04W 8/245 |
| 9,066,277 | B2* | 6/2015 | Cho | H04W 48/06 |
| 9,084,263 | B2* | 7/2015 | Yu | H04W 8/186 |
| 9,191,178 | B2* | 11/2015 | Koc | H04W 76/00 |
| 9,391,900 | B2* | 7/2016 | Hapsari | H04W 48/08 |
| 9,401,820 | B2* | 7/2016 | Kim | H04L 51/38 |
| 9,628,941 | B2* | 4/2017 | Kim | H04W 4/005 |
| 9,661,526 | B2* | 5/2017 | Kim | H04W 74/08 |
| 9,883,440 | B2* | 1/2018 | Zembutsu | H04W 36/165 |
| 9,918,292 | B2* | 3/2018 | Koskela | H04W 60/04 |
| 2004/0259503 | A1 | 12/2004 | Ogura | |
| 2009/0098884 | A1 | 4/2009 | Casati et al. | |
| 2009/0185540 | A1 | 7/2009 | Pelletier et al. | |
| 2010/0227627 | A1 | 9/2010 | Ishii et al. | |
| 2012/0202491 | A1* | 8/2012 | Fox | H04B 7/2609 455/435.1 |
| 2012/0254890 | A1* | 10/2012 | Li | H04W 4/005 719/313 |
| 2013/0021970 | A1* | 1/2013 | Lei | H04W 4/08 370/328 |
| 2013/0080782 | A1* | 3/2013 | Rajadurai | H04L 63/065 713/171 |
| 2013/0122906 | A1 | 5/2013 | Klatt | |
| 2013/0182632 | A1 | 7/2013 | Maeda et al. | |
| 2013/0203450 | A1 | 8/2013 | Mochizuki et al. | |
| 2014/0161024 | A1* | 6/2014 | Speight | H04W 4/70 370/315 |
| 2014/0221025 | A1* | 8/2014 | Chandramouli | H04W 8/08 455/458 |
| 2014/0321365 | A1 | 10/2014 | Shoji et al. | |
| 2015/0237651 | A1 | 8/2015 | Nobusawa et al. | |
| 2015/0359026 | A1* | 12/2015 | Iwai | H04W 76/025 370/329 |
| 2016/0007213 | A1* | 1/2016 | Cui | H04W 4/005 370/230 |
| 2016/0066231 | A1* | 3/2016 | Zembutsu | H04M 3/42 370/331 |
| 2016/0142860 | A1* | 5/2016 | Kim | H04W 60/00 455/435.1 |
| 2016/0150475 | A1* | 5/2016 | Rune | H04W 72/042 370/311 |
| 2016/0174120 | A1* | 6/2016 | Zembutsu | H04W 36/0005 370/331 |
| 2016/0302153 | A1* | 10/2016 | Martin | H04W 76/28 |
| 2017/0019930 | A1* | 1/2017 | Lee | H04W 74/0833 |
| 2017/0034853 | A1* | 2/2017 | Rune | H04W 52/0216 |
| 2017/0135134 | A1* | 5/2017 | Rune | H04W 74/0833 |
| 2017/0142761 | A1* | 5/2017 | Zhang | H04W 76/022 |
| 2017/0272921 | A1* | 9/2017 | Kim | H04W 4/14 |

FOREIGN PATENT DOCUMENTS

| | | |
|---|---|---|
| JP | 2009-077368 A | 4/2009 |
| JP | 2009-526491 A | 7/2009 |
| JP | 2010-541407 A | 12/2010 |
| JP | 2013-532930 A | 8/2013 |
| WO | WO 2012/043523 A1 | 4/2012 |
| WO | WO 2012/043524 A1 | 4/2012 |
| WO | WO 2013/046620 A1 | 4/2013 |
| WO | WO 2014/061537 A1 | 4/2014 |

OTHER PUBLICATIONS

"M2M Communication Core Network Infrastructure and Congestion Countermeasure Techniques", NTT DOCOMO Technical Journal vol. 21 No. 2, Jul. 2013, NTT DOCOMO.

3$^{rd}$ Generation Partnership Project; Technical Specification Group Radio Access Network; Evolved Universal Terrestrial Radio Acces (E-UTRA); Physical channels and modulation (Release 12), pp. 1-136, 3GPP TS 36.211 V12.6.0 (Jun. 2015).

Japanese Office Action of related Japanese Patent Application No. 2014-260328 dated Sep. 11, 2018.

Ericsson, "Capabilities and signalling support for low cost MTC feature," 3GPP TSG-RAN WG2 #85bis, R2-141306, Valencia, Spain, Apr. 4, 2014.

\* cited by examiner

FIG. 8

| PRACH Config. Index | Preamble Format | System frame number | Subframe number | PRACH Config. Index | Preamble Format | System frame number | Subframe number |
|---|---|---|---|---|---|---|---|
| 0 | 0 | Even | 1 | 32 | 2 | Even | 1 |
| 1 | 0 | Even | 4 | 33 | 2 | Even | 4 |
| 2 | 0 | Even | 7 | 34 | 2 | Even | 7 |
| 3 | 0 | Any | 1 | 35 | 2 | Any | 1 |
| 4 | 0 | Any | 4 | 36 | 2 | Any | 4 |
| 5 | 0 | Any | 7 | 37 | 2 | Any | 7 |
| 6 | 0 | Any | 1, 6 | 38 | 2 | Any | 1, 6 |
| 7 | 0 | Any | 2, 7 | 39 | 2 | Any | 2, 7 |
| 8 | 0 | Any | 3, 8 | 40 | 2 | Any | 3, 8 |
| 9 | 0 | Any | 1, 4, 7 | 41 | 2 | Any | 1, 4, 7 |
| 10 | 0 | Any | 2, 5, 8 | 42 | 2 | Any | 2, 5, 8 |
| 11 | 0 | Any | 3, 6, 9 | 43 | 2 | Any | 3, 6, 9 |
| 12 | 0 | Any | 0, 2, 4, 6, 8 | 44 | 2 | Any | 0, 2, 4, 6, 8 |
| 13 | 0 | Any | 1, 3, 5, 7, 9 | 45 | 2 | Any | 1, 3, 5, 7, 9 |
| 14 | 0 | Any | 0, 1, 2, 3, 4, 5, 6, 7, 8, 9 | 46 | N/A | N/A | N/A |
| 15 | 0 | Even | 9 | 47 | 2 | Even | 9 |
| 16 | 1 | Even | 1 | 48 | 3 | Even | 1 |
| 17 | 1 | Even | 4 | 49 | 3 | Even | 4 |
| 18 | 1 | Even | 7 | 50 | 3 | Even | 7 |
| 19 | 1 | Any | 1 | 51 | 3 | Any | 1 |
| 20 | 1 | Any | 4 | 52 | 3 | Any | 4 |
| 21 | 1 | Any | 7 | 53 | 3 | Any | 7 |
| 22 | 1 | Any | 1, 6 | 54 | 3 | Any | 1, 6 |
| 23 | 1 | Any | 2, 7 | 55 | 3 | Any | 2, 7 |
| 24 | 1 | Any | 3, 8 | 56 | 3 | Any | 3, 8 |
| 25 | 1 | Any | 1, 4, 7 | 57 | 3 | Any | 1, 4, 7 |
| 26 | 1 | Any | 2, 5, 8 | 58 | 3 | Any | 2, 5, 8 |
| 27 | 1 | Any | 3, 6, 9 | 59 | 3 | Any | 3, 6, 9 |
| 28 | 1 | Any | 0, 2, 4, 6, 8 | 60 | N/A | N/A | N/A |
| 29 | 1 | Any | 1, 3, 5, 7, 9 | 61 | N/A | N/A | N/A |
| 30 | N/A | N/A | N/A | 62 | N/A | N/A | N/A |
| 31 | 1 | Even | 9 | 63 | 3 | Even | 9 |

FIG. 11

| SEQUENCE NUMBER | Cell ID | GUTI | DESTINATION MME | TIME INFORMATION |
|---|---|---|---|---|
| 38 | 1 | 0001 | 001 | |
| 39 | | | | |
| 40 | | | | |
| 41 | | | | |
| 42 | | | | |
| 43 | | | | |
| 44 | | | | |
| 45 | | | | |

APPARATUS AND METHOD FOR CONTROLLING CONGESTION OF MACHINE-TYPE COMMUNICATION IN A RADIO ACCESS NETWORK

CROSS-REFERENCE TO RELATED APPLICATION

This application is based upon and claims the benefit of priority of the prior Japanese Patent Application No. 2014-260328, filed on Dec. 24, 2014, the entire contents of which are incorporated herein by reference.

FIELD

The embodiment discussed herein is related to apparatus and method for controlling congestion of machine-type communication in a radio access network.

BACKGROUND

As one of radio communication techniques, there is a technique that is referred to as a Machine-to-Machine (M2M) technique. The M2M technique is a technique for enabling not only information devices such as personal computers (PCs) but also "objects" (or "machines"), such as cars, consumer electronics, and sensors, to be autonomously connected to a network, communicate with each other, exchange information with each other without a person, and automatically control the other devices and the other objects. The M2M technique has started to be widely used since communication devices have been downsized and installed in various "objects" and "machines" (also referred to as "devices"), and wireless communication areas have been increased in size because of the development of network infrastructures. Communication services based on the M2M technique are referred to as Machine-Type Communication (MTC) services in some cases.

Examples of related art are Japanese National Publication of International Patent Application No. 2009-526491, Japanese Laid-open Patent Publication No. 2005-12335, Japanese National Publication of International Patent Applications Nos. 2002-538744, No. 2010-541407, and 2013-532930, Japanese Laid-open Patent Publication No. 2009-77368, and International Publication Pamphlet No. WO 2013/046620.

Examples of non-patent documents of related art are ""LTE release 12—Taking Another Step toward the Networked Society" Ericsson White Paper 284, 23-3189, Uen, January 2013, Ericsson", ""M2M Communication Core Network Infrastructure and Congestion Countermeasure Technique", NTT DOCOMO Technical Journal Vol. 21 No. 2, July 2013, NTT DOCOMO", and "3GPP TS 36.211 Technical Specification Group Radio Access Network; Evolved Universal Terrestrial Radio Access (E-UTRA); Physical Channels and Modulation".

SUMMARY

According to an aspect of the Invention, a system includes a base station that forms a wireless communication area in a radio access network, and a radio device that transmits a connection request to the base station. The radio device sets a specific signal sequence in the connection request. The base station stores an attach request for registering a radio device in the radio access network, and receives the connection request including the specific signal sequence from the radio device located in the wireless communication area. In response to the detection of the specific signal sequence, the base station transmits the attach request to a higher-level network node before receiving, from the radio device, another attach request that is scheduled to be received after the detection of the specific signal sequence.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram illustrating an example of a configuration of a physical random access channel, according to an embodiment;

FIG. 11 is a diagram illustrating an example of a management table, according to an embodiment;

DESCRIPTION OF EMBODIMENT

Figure 1:
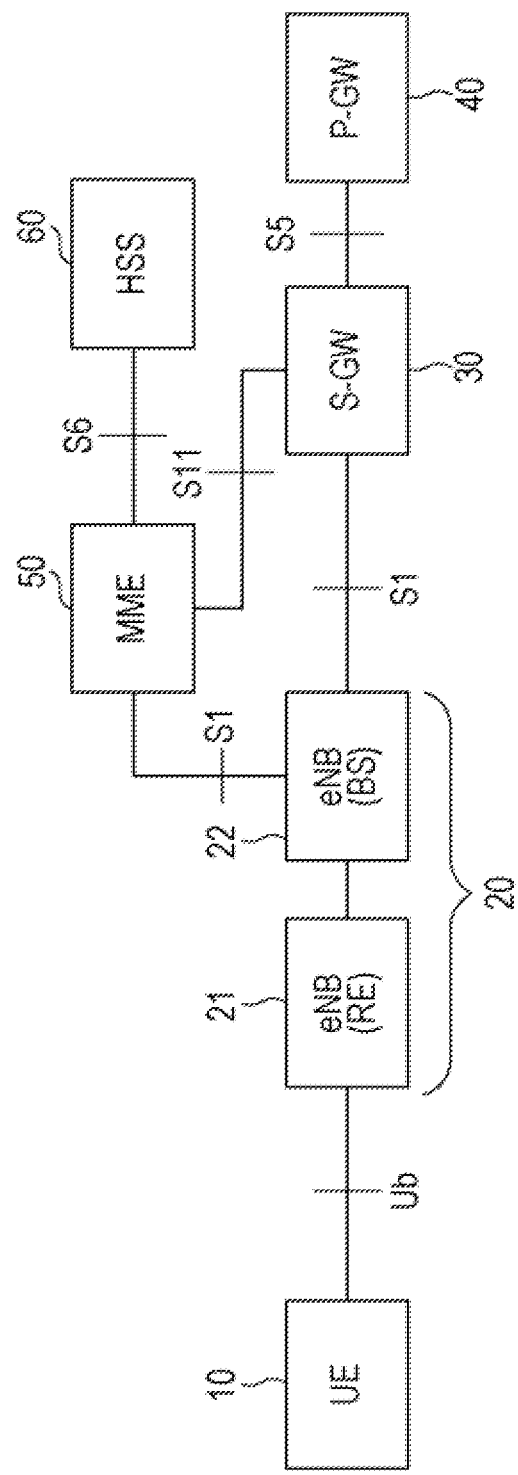
FIG. 1 is a block diagram illustrating an example of Long Term Evolution (LTE) architecture defined by the 3rd Generation Partnership Project (3GPP)

Many radio devices (also referred to as "MTC devices") that support MTC services may be installed in a radio area of a base station.

When many MTC devices concurrently start to communicate with a higher-level network through the base station, congestion may occur in communication (or a process) in the higher-level network.

It is desirable to suppress congestion in a process in a higher-network.

Hereinafter, an embodiment is described with reference to the accompanying drawings. The embodiment described below is an example and is not Intended to exclude the application of various modifications and techniques that are not explicitly described. In addition, various exemplified aspects described below may be combined. In the drawings described in the embodiment, each of parts indicated by the same reference numeral is the same as or similar to the other parts, unless otherwise specified.

FIG. 1 is a block diagram illustrating an example of LTE architecture defined by the 3GPP. The "LTE architecture" is an example of a "radio communication system".

The LTE architecture illustrated in FIG. 1 includes UE 10, an eNB 20 (that may include an RE 21 and a 8S 22), an S-GW 30, a P-GW 40, an MME 50, and an HSS 60, for example.

The UE is an abbreviation for "user equipment". The UE 10 is a radio terminal, for example. The radio terminal is an example of a communication device that is able to wirelessly communicate with the eNB in a radio area provided by the eNB.

The "radio terminal" may be referred to as a "radio device", a "radio apparatus", a "terminal apparatus", or the like. The radio terminal 10 may be a fixed terminal whose position is not changed. Alternatively, the radio terminal 10 may be a mobile terminal (also referred to as "mobile device") whose position is changed. As an unlimited example, the radio terminal 10 may be portable UE such as a mobile phone, a smartphone, or a tablet terminal.

The eNB is an abbreviation for an "enhanced node B" and the eNB 20 is an example of a base station. The eNB 20 may include a radio functional unit and another basic functional unit that may be unified or separated from each other, as exemplified in FIG. 1.

The radio functional unit may be referred to as radio equipment (RE) 21. The basic functional unit may be referred to as a base station (BS) 22. The RE 21 may be connected to and communicate with the BS 22 by a wired interface, for example. A common public radio interface (CPRI) that is an example of an optical interface may be applied to the wired interface.

The RE 21 provides a radio interface (hereinafter indicated by Ub in some cases) with the UE 10. In other words, the RE 21 provides a radio area in which the UE 10 may be wirelessly connected to the RE 21 and wirelessly communicate with the RE 21. The radio area may be provided by the BS 22. In both cases, the radio area is formed by the eNB 20.

The "radio area" may be referred to as a "cell", a "coverage area", or a "communication area". The "cell" may be divided into "sector cells". The "cell" may include a macro cell and a small cell.

The small cell is an example of a cell whose footprint (coverage) is smaller than the macro cell. The small cell may be referred to as a different name depending on the coverage area. For example, the small cell may be referred to as a "femto cell", a "pico cell", a "micro cell", a "nano cell" a "metro cell", a "home cell", or the like.

Radio communication between the eNB 20 and the UE 10 may be referred to as "cellular communication". A radio communication method that conforms to Long Term Evolution (LTE) or LTE-Advanced may be applied to the cellular communication, for example. As a representative or complex example, a radio communication method that conforms to another standard such as Worldwide Interoperability for Microwave Access (WiMax) (registered trademark) may be applied to radio communication between the RE (or the BS) and the UE.

The eNB 20 (for example, the BS 22) may be connected to and communicate with the S-GW 30 and the MME 50, for example. The "S-GW" Is an abbreviation for a "serving gateway". The MME is an abbreviation for a "mobility management entity". The eNB 20 (BS 22), the S-GW 30, and the MME 50 may be connected to and communicate with each other via an interface that Is referred to as an S1 Interface, for example.

The S-GW 30 may be connected to and communicate with the P-GW 40 via an interface that is referred to as an SS interface. The "P-GW" is an abbreviation for a "packet data network gateway". The P-GW 40 may be connected to and communicate with a packet data network (PDN) such as the Internet or an intranet.

A user packet may be transmitted and received between the UE 10 and the PDN through the S-GW 30 and the P-GW 40. The user packet is an example of user data and may be referred to as a user plane signal.

The S-GW 30 may process the user plane signal, for example. A control plane signal may be processed by the MME 50. The S-GW 30 may be connected to and communicate with the MME 50 via an interface that is referred to as an S11 Interface.

The MME 50 manages positional information of the UE 10, for example. The S-GW 30 may execute, based on the positional information managed by the MME 50, movement control such as a process of switching between paths for the user plane signal in response to a movement of the UE 10. The movement control may include control to be executed in response to handover of the UE 10.

The HSS is an abbreviation for a "home subscriber server". The HSS 60 may be connected to and communicate with the MME 50 via an interface that is referred to as an S6 interface, for example. The HSS 60 is an example of a server that executes control based on a communication service provided to the UE 10 (also referred to as "subscriber") and processes subscriber data.

A network that includes the S-GW 30, the P-GW 40, the MME 50, and the HSS 60 may be referred to as a "core network". The "core network" may correspond to a higher-level network for the eNB 20. Thus, the S-GW 30, the P-GW 40, the MME 50, and the HSS 60 may correspond to elements (NEs) or entities of the "core network".

The eNB 20 may be connected to the "core network" via the "S1 interface" that is an example of the wired interface. The eNB 20 may be connected to and communicate with the "core network" via a radio interface.

A network that includes the eNB 20 and the core network may be referred to as a radio access network (RAN). An example of the RAN is an evolved universal terrestrial radio access network (E-UTRAN).

According to the LTE architecture defined by the 3GPP, the RAN is optimized to ensure packet communication with a large capacity and a short delay. The 3GPP has considered and discussed the enhancement and expansion of functions for Machine-Type Communication (MTC) services in the LTE architecture as the development of an RAN technique for LTE.

The MTC services are an example of communication services based on the M2M technique. Examples of the MTC services using the M2M technique are a service of remotely monitoring vending machines and elevators that widely exist at many locations, a service of providing, in real time, information such as traffic congestion information and information of available spaces of parking lots through communication devices installed in moving objects such as motor vehicles.

Figure 2:
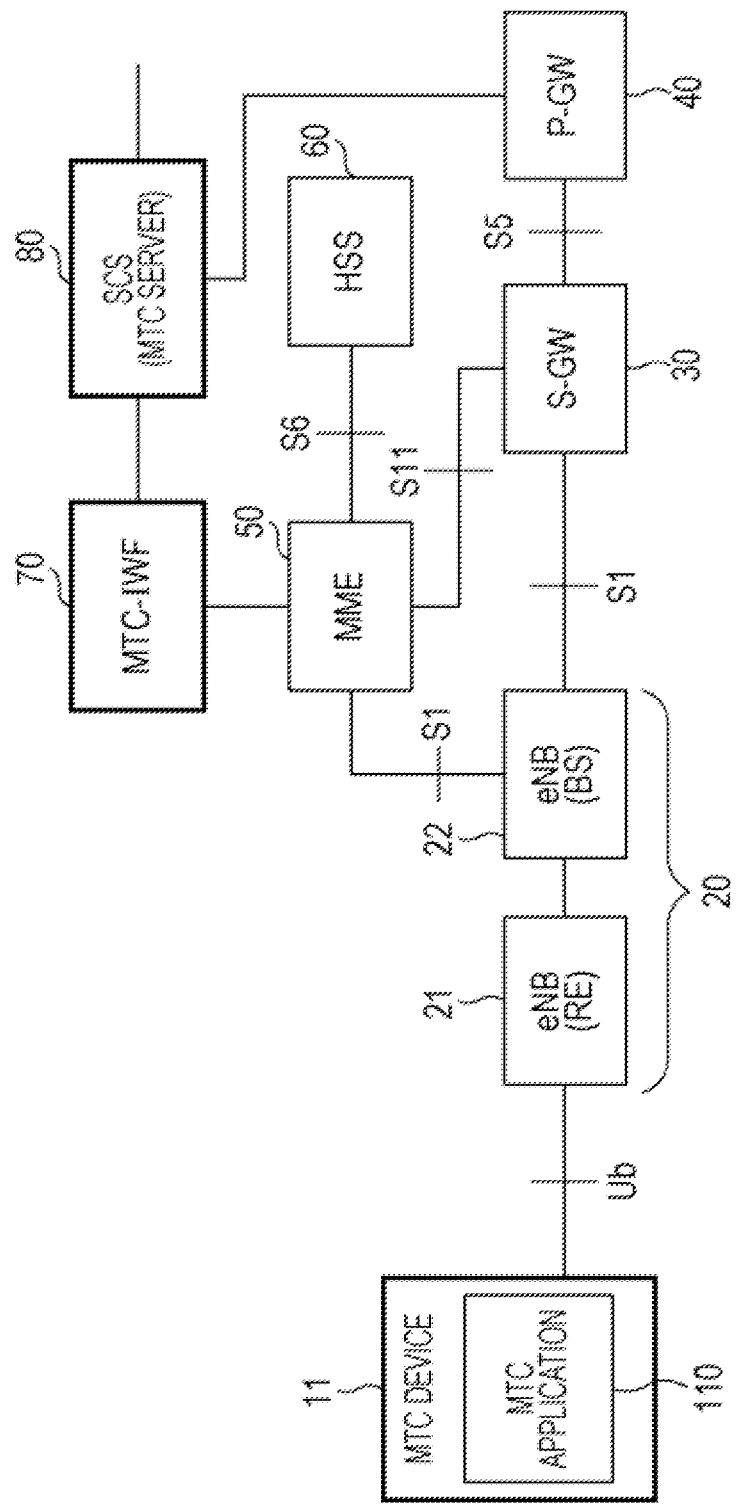
FIG. 2 is a block diagram illustrating an example of LTE architecture to which an MTC service is applied.

FIG. 2 is a block diagram illustrating an example of LTE architecture to which an MTC service is applied. The LTE architecture illustrated in FIG. 2 is defined in the 3GPP release 12, for example.

Comparing FIG. 2 with FIG. 1, the LTE architecture Illustrated in FIG. 2 is different from the LTE architecture Illustrated in FIG. 1 in that the LTE architecture illustrated in FIG. 2 includes an MTC device 11 installed instead of the UE 10 or newly added and includes an MTC-IWF 70 and SCS 80 newly added in the core network. The "MTC device" may be referred to as an "M2M device".

The MTC device 11 has a radio communication function of supporting radio communication with the RAN, for example. The MTC device 11 is an example of a radio device that wirelessly communicates with the eNB 20 in the radio area provided by the eNB 20, like the UE 10.

Radio communication by the MTC device 11, however, may be communication that is executed without an operation by a person (user), unlike the UE 10. For example, the radio communication by the MTC device 11 may be communication that is executed by an application (also referred to as "program" or "software") Installed in the MTC device 11 and able to be autonomously executed without a user operation.

For example, the MTC device 11 may be a sensor device, a meter (measurer), or the like that has a radio communication function. Alternatively, the MTC device 11 may be a radio device attached to a moving object (also referred to as "vehicle") such as a motor vehicle, an airplane, or a ship.

The MTC device that is attached to the vehicle such as a motor vehicle and whose position may be changed may correspond to a "moving device". In this case, the UE and the MTC device may be collectively referred to as a "moving device".

The MTC device 11 may include an MTC application (also referred to as "program" or "software") 110 for the MTC service to be achieved, as exemplified in FIG. 2.

The MTC device 11 may provide information based on the MTC service by radio communication in response to the execution of the MTC application 110, for example. Providing the information based on the MTC service may include the transmission of information sensed or measured by the MTC device 11 to the SCS 80 installed in the RAN, for example. The communication based on the MTC service may be periodically or randomly executed.

The "SCS" is an abbreviation for a "service capability server". For example, the SCS 80 is a server that provides the MTC service. Thus, the SCS 80 may be referred to as an MTC server 80.

An MTC application that communicates with the MTC application 110 of the MTC device 11 may be installed in the SCS 80, for example. The SCS 80 may use the MTC application 110 to terminate communication executed between the SCS 80 and the MTC device 11 based on the MTC service. The SCS 80 may be connected to and communicate with the P-GW 40 and the MTC-IWF 70, for example.

The "MTC-IWF" is an abbreviation for "machine type communication-inter working function". The MTC-IWF 70 may transmit and receive a control plane signal to and from the SCS 80 and the MME 50.

It is considered that MTC devices 11 each communicate a relatively small amount of data at a relatively low frequency without communicating a large amount of data at a high rate, unlike the UE 10. In addition, it is considered that, as MTC devices 11, there exist not only devices such as vending machines and smart meters that continuously operate by power fed from externals for long times, but also devices that operate by batteries with limited capacities from the perspective of downsizing and costs, like the UE 10.

Figure 3:
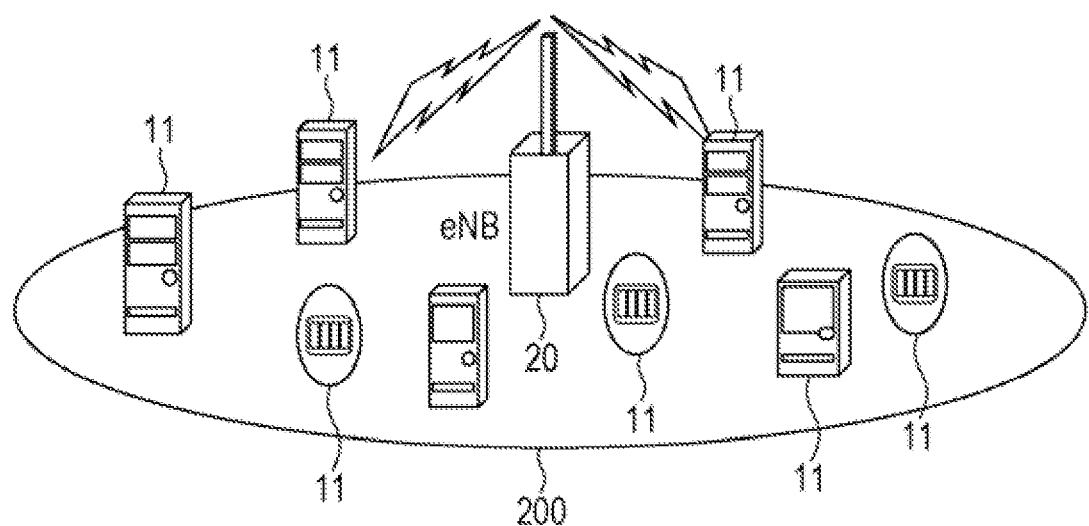
FIG. 3 is a schematic diagram illustrating an example of a configuration of a radio communication system to which MTC services are applied.

FIG. 3 schematically Illustrates a state in which MTC devices 11 such as vending machines and smart meters are installed in a radio area 200 formed by the eNB 20. The MTC devices 11 may wirelessly communicate with the eNB 20 in the radio area 200.

In order to increase operating times of the MTC devices to be driven by batteries (or in order to save power), the 3GPP has discussed increases (or reductions in frequencies at which data is transmitted and received in MTC services) in intervals at which data is transmitted and received in MTC services.

For example, the MTC devices 11 may be devices that are activated (or woken up) only when communication is to be executed and stop or transition to sleep states when the communication is terminated.

In addition, it is considered that the number of MTC devices 11 that access the single eNB 20 significantly increase, since MTC devices 11 are widely used. Thus, the 3GPP has discussed various issues such as re-examination of a procedure for connecting MTC devices 11 to the RAN.

Although communication between people (or between UE) is currently in the main stream, it is considered that the number of cases where MTC applications 110 installed in the MTC devices 11 autonomously communicate with each other will increase in the future.

It is considered that if a user (person) that uses the UE 10 falls to originate a speech call several times, the user gives up originating a call (or connecting the UE 10 to the RAN). However, if the MTC applications 110 are used, the MTC applications 110 continuously try to connect the MTC devices 11 to the RAN unless a measure or method of restricting communication is taken or executed.

If the number of MTC devices 11 increases, the number of status reports transmitted by the MTC devices 11 to the SCS 80 may increase and a frequency at which the movement control is executed in response to a movement of any of the MTC devices 11 may increase. Thus, a large number of MTC devices 11 that exist in the radio area 200 may simultaneously request the use of shared resources of the RAN.

For example, a large number of radio devices (that may include MTC devices 11 and UE 10) may concurrently start connection processes in the same radio area 200. In addition, in random access procedures executed between radio devices and the eNB 20, multiple radio devices may enter congestion states and frequently execute retransmission. "Procedures" may be referred to as "processes", "sequences", or the like.

Furthermore, process loads of the radio devices may increase and process loads of elements (also referred to as "nodes" or "entities") of the RAN and core network (hereinafter also referred to as "higher-level network") may increase and cause congestion.

In the embodiment, when an MTC service is applied to the radio communication system such as the LTE architecture, an increase in a process load and the occurrence of congestion in the higher-level network may be suppressed.

For example, before events, such as events of starting connection processes by a large number of MTC devices in the same radio area 200, concurrently occur, the eNB 20 may transmit, to the higher-level network, requests to attach multiple MTC devices 11 to the higher-level network on behalf of the MTC devices 11. Thus, an increase in the process load and the occurrence of congestion in the higher-level network may be avoided or suppressed.

Figure 4:
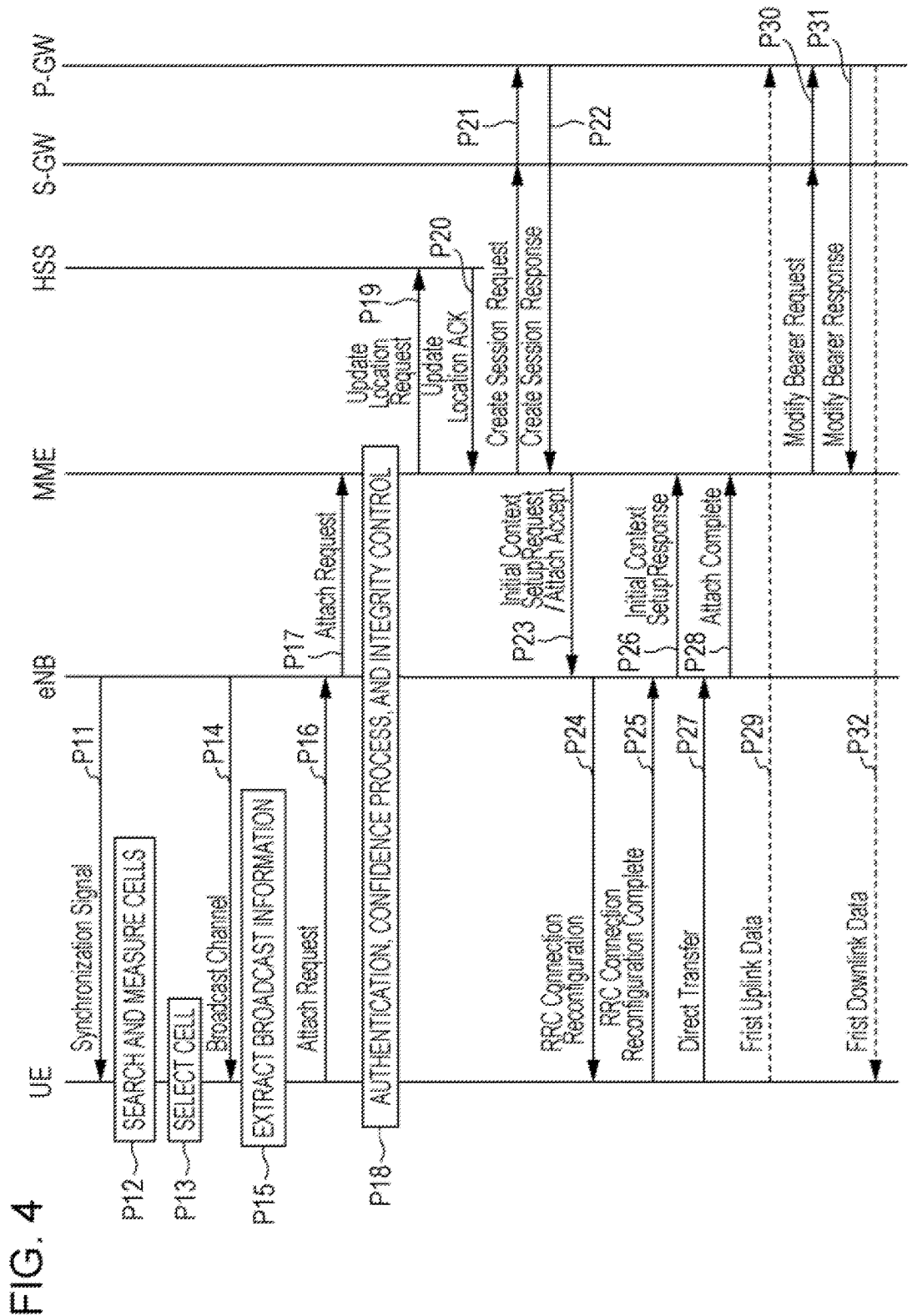
FIG. 4 is a sequence diagram illustrating an example of a process of attaching normal UE to a RAN in LTE architecture.
Figure 5:
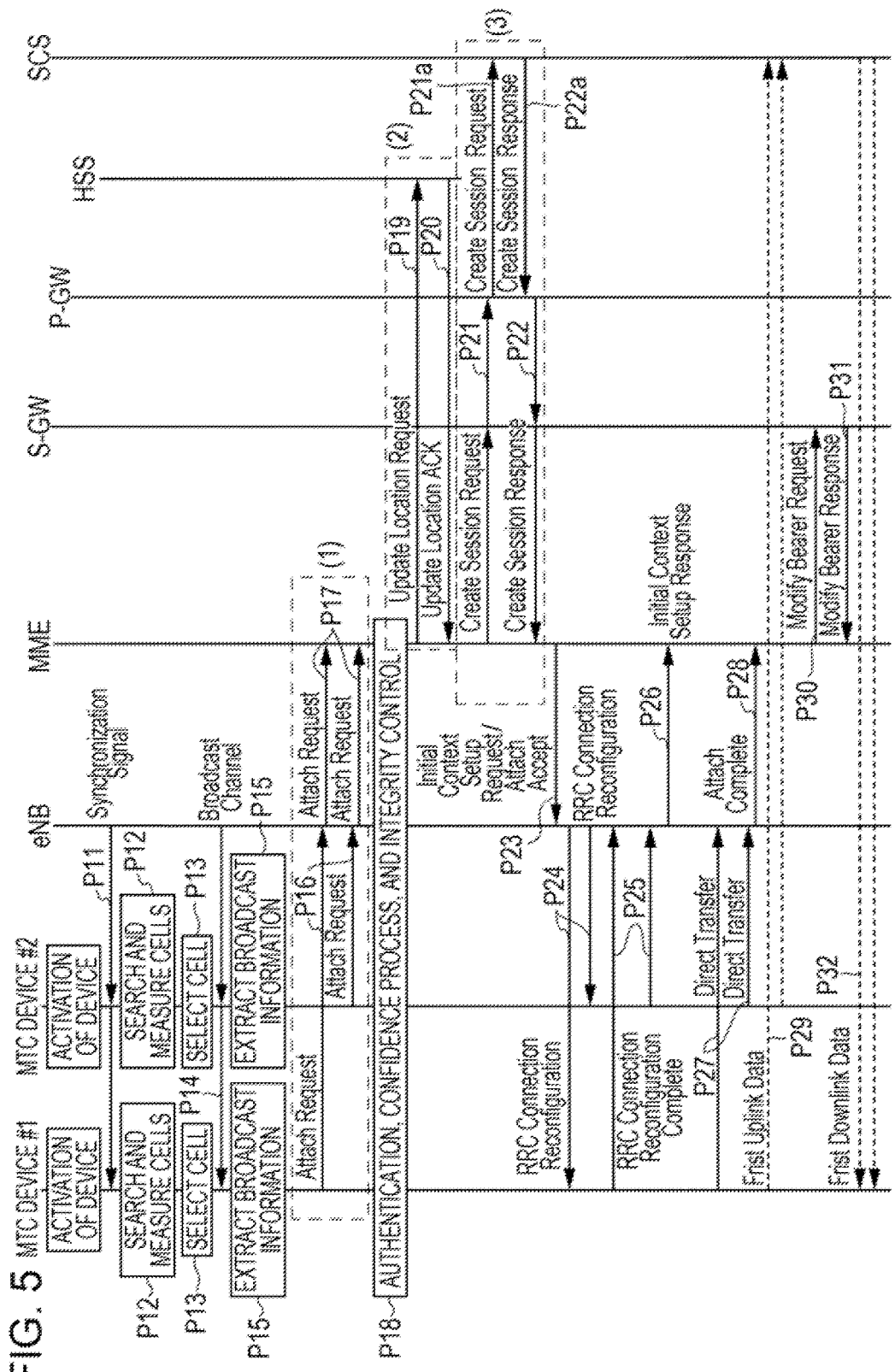
FIG. 5 is a sequence diagram illustrating an example of an attachment process in LTE architecture to which an MTC service is applied.

In order to describe the aforementioned concern in detail, FIG. 4 illustrates an example of a process (sequence) of attaching the normal UE 10 to the RAN in the LTE architecture exemplified in FIG. 1. In addition, FIG. 5 illustrates an example of the attachment process in the LTE architecture that is exemplified in FIG. 2 and to which the MTC service is applied.

As exemplified in FIG. 4, the UE 10 searches (or measures) cells and selects a cell appropriate for connection based on a synchronization signal (SS) transmitted by the eNB 20 when power is supplied to the UE 10 and the UE 10 is woken up (in processes P11 to P13). The UE 10 may select a cell appropriate for connection based on the intensity of the synchronization signal received by the UE 10 or may select a cell that is appropriate for connection and from which a signal with the maximum intensity is received.

After that, the UE 10 receives broadcast information transmitted by the eNB 20 in the selected cell and extracts information set in the received broadcast information (in processes P14 and P15). The broadcast information may be transmitted through a broadcast channel.

The broadcast information has, set therein, information identifying a system bandwidth of a downlink (DL), a system frame number (SNB), the number of transmission antennas, and the like. The broadcast information may be referred to as a master information block (MIB).

The UE 10 establishes a radio link (for example, an RRC connection) between the UE 10 and the eNB 20 by executing a random access (RA) procedure between the UE 10 and the eNB 20 forming the selected cell and a radio resource control (RRC) connection procedure between the UE 10 and the eNB 20. In FIG. 4, details of the RA procedure and the RRC connection procedure are omitted.

When establishing the radio link between the UE 10 and the eNB 20, the UE 10 transmits an Attach Request (message) to the eNB 20 (in a process P16). The Attach Request is an example of a signal that indicates a request to register the UE 10 in the RAN (or a request to connect the UE 10 to the RAN). The Attach Request may include subscriber information, terminal information, and the like.

Based on the information Included in the Attach Request, security processes for the UE 10, a process of registering the position of the UE 10, a process of setting a session, the RRC connection process, and the like are executed in higher-level network nodes for the eNB 20, as described below.

The "higher-level network nodes" are the MME 50, the S-GW 30, the P-GW 40, the HSS 60, and the like that are described above. The "session" may be also referred to as a "connection" or a "bearer".

Upon receiving the Attach Request, the eNB 20 transmits the received Attach Request to the destination MME 50 specified in the Attach Request (in a process P17). Upon receiving the Attach Request, the MME 50 executes, based on authentication information, the security processes, such as authentication, a confidence process, and integrity control, on the UE 10 that is a source of the Attach Request (in a process P18). The authentication information may be acquired from the HSS 60 that manages the subscriber information, for example.

When the security processes executed on the UE 10 are normally terminated, the MME 50 may transmit, to the HSS 60, a request (Update Location Request) to register (update) the position of the UE 10 on which the authentication has been executed (in a process P19).

Upon receiving the Update Location Request to register the position of the UE 10 from the MME 50, the HSS 60 updates and registers information included in the Update Location Request and indicating the position of the UE 10, and returns, to the MME 50, a response (Update Location ACK) to the registration of the position (in a process P20), for example.

Upon receiving the Update Location ACK from the HSS 60, the MME 50 transmits, to the S-GW 30, a request (Create Session Request) to create a session (in a process P21).

Upon receiving the Create Session Request, the S-GW 30 creates the bearer session between the S-GW 30 and the P-GW 40 based on the received Create Session Request while coordinating with the P-GW 40, and returns a response (Create Session Response) to the creation of the session to the MME 50 (in a process P22).

The Create Session Response may include information (also referred to as "transmission information") to be used to cause the eNB 20 to set, between the eNB 20 and the UE 10, a radio bearer (or an RRC connection) to be connected to the bearer created and set between the S-GW 30 and the P-GW 40.

Upon receiving the Create Session Response, the MME 50 uses an Initial Context Setup Request to transmit, to the eNB 20 that is the source of the Attach Request, the transmission information to be used to set the RRC connection (in a process P23), for example. The MME 50 may transmit, to the eNB 20, the Initial Context Setup Request and a signal (Attach Accept) that indicates that the Attach Request was normally received.

Upon receiving the Initial Context Setup Request from the MME 50, the eNB 20 transmits, to the UE 10 based on the transmission information included in the Initial Context Setup Request, an RRC message to be used to set the RRC connection between the eNB 20 and the UE 10 that is the source of the Attach Request (in a process P24). The RRC message may be referred to as an RRC Connection Reconfiguration message.

Upon receiving the RRC Connection Reconfiguration message from the eNB 20, the UE 10 sets the RRC connection between the UE 10 and the eNB 20 based on setting information, included in the RRC Connection Reconfiguration message, of the RRC connection and transmits, to the eNB 20, an RRC message Indicating the completion of the setting (in a process P25). The RRC message that indicates the completion of the setting may be referred to as an "RRC Connection Reconfiguration Complete" message.

Upon receiving, from the UE 10, the message Indicating the completion of the setting of the RRC connection, the eNB 20 transmits an Initial Context Setup Response to the MME 50 (in a process P26).

When the setting of the RRC connection is completed, the UE 10 transmits a Direct Transfer message to the eNB 20 and starts a direct transfer procedure (in a process P27).

The "direct transfer procedure" may be executed to establish a signaling connection (also referred to as "control plane connection") in an uplink (UL) of the RRC connection in accordance with a request to transmit user data of the UL in a high-level layer for the UE 10.

Upon receiving the Direct Transfer message, the eNB 20 transmits, to the MME 50, a message (Attach Complete message) indicating the completion of the process of attaching the UE 10 to the RAN (in a process P28).

After that, the UE 10 transmits the user data of the UL to the eNB 20 through the established RRC connection. In other words, the UE 10 transmits the user data to the P-GW 40 through the created bearer session (in a process P29).

When user data to be transmitted from the PDN to the UE 10 exists, the P-GW 40 transmits the user data of the downlink (DL) through the eNB 20 and the bearer session to the UE 10 (in a process P32).

The bearer between the S-GW 30 and the P-GW 40 may change in response to a movement (for example, handover or the like) of the UE 10, for example. In this case, the MME 50 may transmit a Modify Bearer Request message to the S-GW 30 and the P-GW 40 (in a process P30).

Upon receiving the Modify Bearer Request message from the MME 50, the S-GW 30 may modify the bearer in cooperation with the P-GW 40 and return a Modify Bearer Response message to the MME 50 (in a process P31). The modification of the bearer allows the UE 10 to normally continue to communicate with the PDN even during a movement of the UE 10.

Next, FIG. 5 illustrates an example of the attachment process in the LTE architecture that is exemplified in FIG. 2 and to which the MTC service is applied. FIG. 5 illustrates, as an unlimited example, a case where two MTC devices 11 (#1 and #2) transmit Attach Requests to the single eNB 20.

When the MTC devices #1 and #2 are woken up by the supply of power or the like, the MTC devices #1 and #2 each search cells, select a cell, extract broadcast information, and transmit an Attach Request to the eNB 20, like the process, exemplified in FIG. 4, of attaching the UE 10.

The eNB 20 transmits the Attach Requests to the MME 50. The MME 50 transmits a request to higher-level nodes, such as the HSS 60, the S-GW 30, the P-GW 40, and the SCS 80, for each of the received Attach Requests, and receives a response from the higher-level nodes for each of the received Attach Requests.

For example, the MME 50 transmits an Update Location Request indicating a request to register the position of the MTC device #1 or #2 to the HSS 60, and receives an Update Location ACK message indicating a response to the registration of the position of the MTC devices #1 or #2 from the HSS 60, for each of the received Attach Requests. In addition, the MME 50 transmits a Create Session Request indicating a request to create sessions to the SCS 80 through the S-GW 30 and the P-GW 40, and receives a Create Session Response Indicating a response to the creation of the sessions from the SCS 80 through the S-GW 30 and the P-GW 40.

FIG. 5 exemplifies a case where the Create Session Request Indicating a request to create the sessions based on the MTC applications 110 of the MTC devices 11 and the Create Session Response indicating the response to the creation of the sessions are transmitted and received between the P-GW 40 and the SCS 80 in processes P21a and P22a.

For example, it is assumed that a large number of MTC devices 11 that periodically communicate with the SCS 80 exist in the radio area 200 formed by the eNB 20. In this case, when the large number of MTC devices 11 are concurrently woken up, a large number of Attach Requests are transmitted to the higher-level network nodes through the eNB 20. Thus, congestion of the requests transmitted toward the higher-level network nodes may occur and process loads of the higher-level network nodes may increase.

For example, (1) congestion of the Attach Requests transmitted toward the MME 50, (2) congestion of Update Location Requests transmitted toward the HSS 60, (3) congestion of connection requests (requests to create sessions) transmitted toward the specific SCS 80 having the MTC application, and the like easily occur. In addition, process loads of the MME 50, HSS 60, and SCS 80 may easily increase.

The congestion, described in the aforementioned item (1), of the Attach Requests transmitted toward the MME 50 may affect requests transmitted toward the HSS 60 and the SCS 80 in a chain reaction. In other words, the congestion described in the aforementioned items (2) and (3) may easily occur due to the congestion described in the aforementioned item (1).

The embodiment describes a method of handling the congestion of the Attach Requests transmitted toward the MME 50 in a case where a large number of MTC devices 11 may be connected to the single eNB 20.

Figure 6:
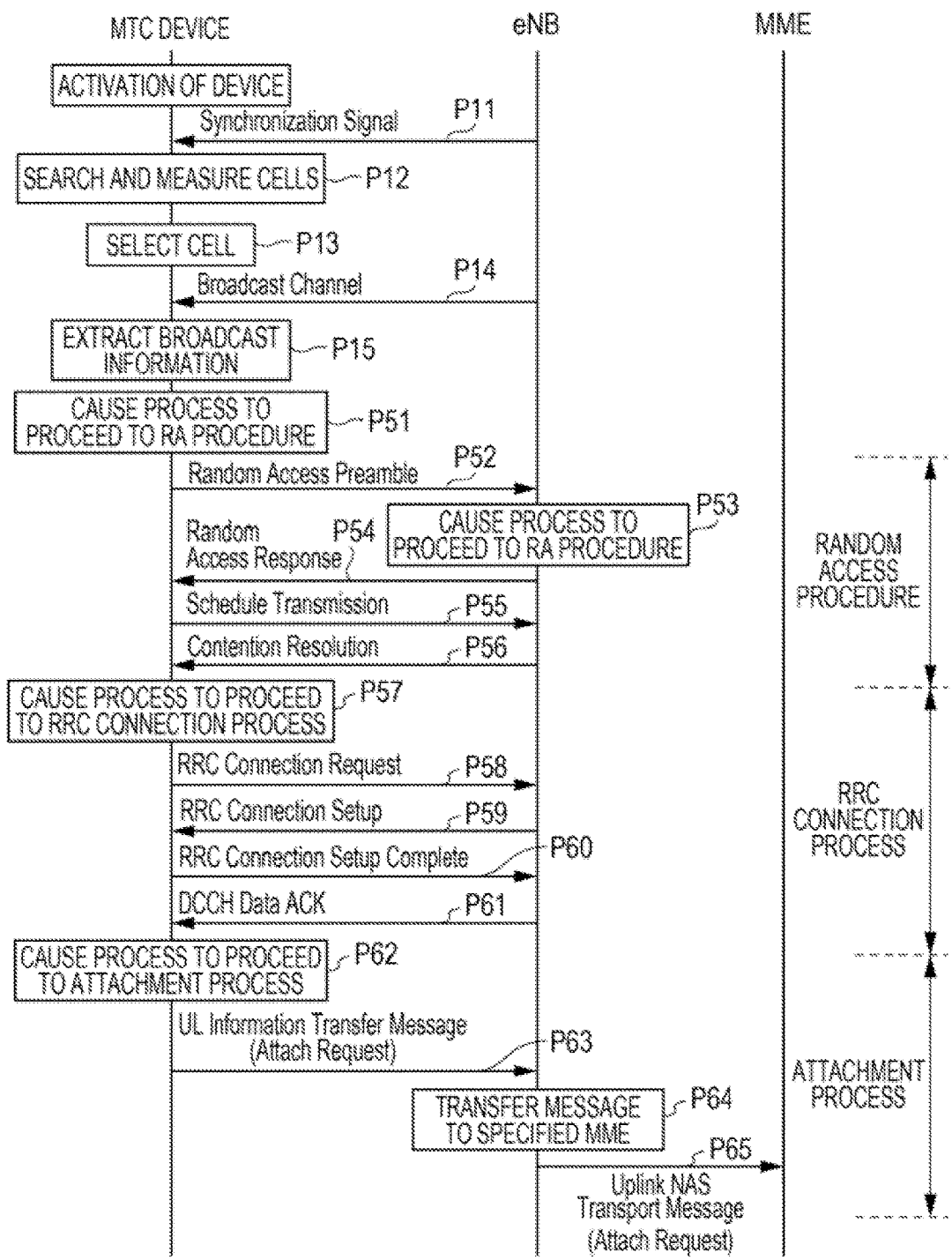
FIG. 6 is a sequence diagram illustrating a detailed example of an attachment process.

First, before the method of handling the congestion is described, an example of the RA procedure, the RRC connection procedure, and the attachment process for an MTC device 11 is described with reference to FIG. 6. The RA procedure exemplified in FIG. 6 is an example of an RA procedure that is referred to as a "contention-based" RA procedure. The application of a "non-content-based" RA procedure, however, is not excluded.

As exemplified in FIG. 6, after the MTC device 11 is woken up, the MTC device 11 searches cells, selects a cell, extracts broadcast information, and executes the RA procedure and the RRC connection procedure before transmitting an Attach Request.

For example, after causing the process to proceed to the RA procedure, the MTC device 11 randomly selects any of multiple Random Access (RA) Preambles prepared in advance and transmits the selected RA Preamble to the eNB 20 (in processes P51 and P52).

When detecting the RA Preamble transmitted by the MTC device 11 (or successfully receiving the RA Preamble), the eNB 20 causes the process to proceed to the RA procedure and returns a RA Response to the MTC device 11 (in processes P53 and P54).

Upon receiving the RA Response from the eNB 20, the MTC device 11 transmits a Schedule Transmission message to the eNB 20 (in a process P55). The Schedule Transmission message may include information (for example, an identifier (ID)) identifying the MTC device 11 that is a source of the Schedule Transmission message.

The eNB 20 receives the Schedule Transmission message and transmits a Contention Resolution message Indicating the success of the RA to the MTC device 11 whose ID was successfully detected by the eNB 20 (in a process P56).

Upon receiving the Contention Resolution message, the MTC device 11 causes the process to proceed to the RRC connection process and transmits an RRC Connection Request message to the eNB 20 (in processes P57 and P58).

Upon receiving the RRC Connection Request message from the MTC device 11, the eNB 20 transmits, to the MTC device 11, an RRC Connection Setup message including cell setting Information to be used to set an RRC connection and the like (in a process P59).

Upon receiving the RRC Connection Setup message from the eNB 20, the MTC device 11 sets the RRC connection between the MTC device 11 and the eNB 20 based on the cell setting information and the like. When the setting is completed, the MTC device 11 transmits an RRC Connection Setup Complete message to the eNB 20 (in a process P60). The RRC Connection Setup Complete message may be transmitted through an UL dedicated control channel (DCCH).

Upon receiving the RRC Connection Setup Complete message through the UL DCCH from the MTC device 11, the eNB 20 may transmit a confirmation response (DCCH Data ACK) message to the MTC device 11 through a DL DCCH (in a process P61).

Upon receiving the DCCH Data ACK message through the DL DCCH, the MTC device 11 may cause the process to proceed to the attachment process and may transmit, to the eNB 20, an UL Information Transfer message to be used to transfer UL information to the MME 50 (in processes P62 and P63). The UL Information Transfer message corresponds to the aforementioned Attach Request. The Attach Request may be also referred to as a None-Access Stratum (NAS) message.

Upon receiving the Attach Request from the MTC device 11, the eNB 20 transmits (or transfers) the received Attach Request (NAS message) to the destination MME 50 specified in the Attach Request (in processes P64 and P65).

The aforementioned processes P62 to P65 may correspond to the attachment process indicated by P16 and P17 exemplified in FIGS. 4 and 5.

Referring to FIG. 6, when multiple MTC devices 11 that exist in the radio area 200 formed by the single eNB 20 are woken up at the same time, the MTC devices 11 concurrently transmit, to the eNB 20, RRC Connection Request messages and Attach Requests to be transferred to the MME 50.

The MTC devices 11 that are woken up may communicate with the same SCS 80 (refer to FIG. 2) and provide the same MTC service. In this case, it is considered that destination MMEs 50 specified in the Attach Requests by the MTC devices 11 are the same.

Referring to FIG. 2, it is considered that the MME 50 that is connected to the SCS 80 through the MTC-IWF 70 corresponds to the destination MME 50 common to the multiple MTC devices 11 that provide the same MTC service.

In the embodiment, the eNB 20 stores (or holds) and manages details of Attach Request messages received from the MTC devices 11. When a certain MTC device 11 that provides the same MTC service as an MTC service provided by an MTC device 11 that previously transmitted an Attach Request tries to be connected to the eNB 20, the eNB 20 transmits an Attach Request to the MME 50 on behalf of the certain MTC device 11. In other words, the eNB 20 transmits the held Attach Request to the MME 50 without waiting to receive (detect) the Attach Request from the certain MTC device 11.

The transmission (also referred to as substitute transmission) of the Attach Request by the eNB 20 may be executed before the completion of the RRC connection process or may be executed in the RA procedure, for example. Thus, timings when Attach Requests are transmitted to the MME 50 may be distributed and congestion of the Attach Requests may be avoided or suppressed.

In order to achieve the aforementioned substitute transmission of the Attach Request, the eNB may have a function of identifying whether or not a radio device that tried to be connected to the eNB 20 is an MTC device 11. In addition, the eNB 20 may have a function of managing, as an MTC device group, multiple MTC devices 11 that communicate with the same MME 50.

In addition, the eNB 20 may have a function of holding details of Attach Request messages previously received from MTC devices 11. In addition, the eNB 20 may have a function of transmitting, to the MME 50, Attach Request messages whose details are held by the eNB 20.

An example of a process of achieving the aforementioned substitute transmission of the Attach Request is described below with reference to FIGS. 7 to 16. Hereinafter, the RA procedure and the RRC connection procedure may correspond to one of "connection request procedures (or processes)" for requesting a connection to the eNB 20. In other words, the RA procedure and the RRC connection procedure may be collectively referred to as a "connection request procedure".

Process of Identifying MTC Device

An example of a process of identifying an MTC device 11 by the eNB 20 is described with reference to FIGS. 7 to 9.

Figure 7:
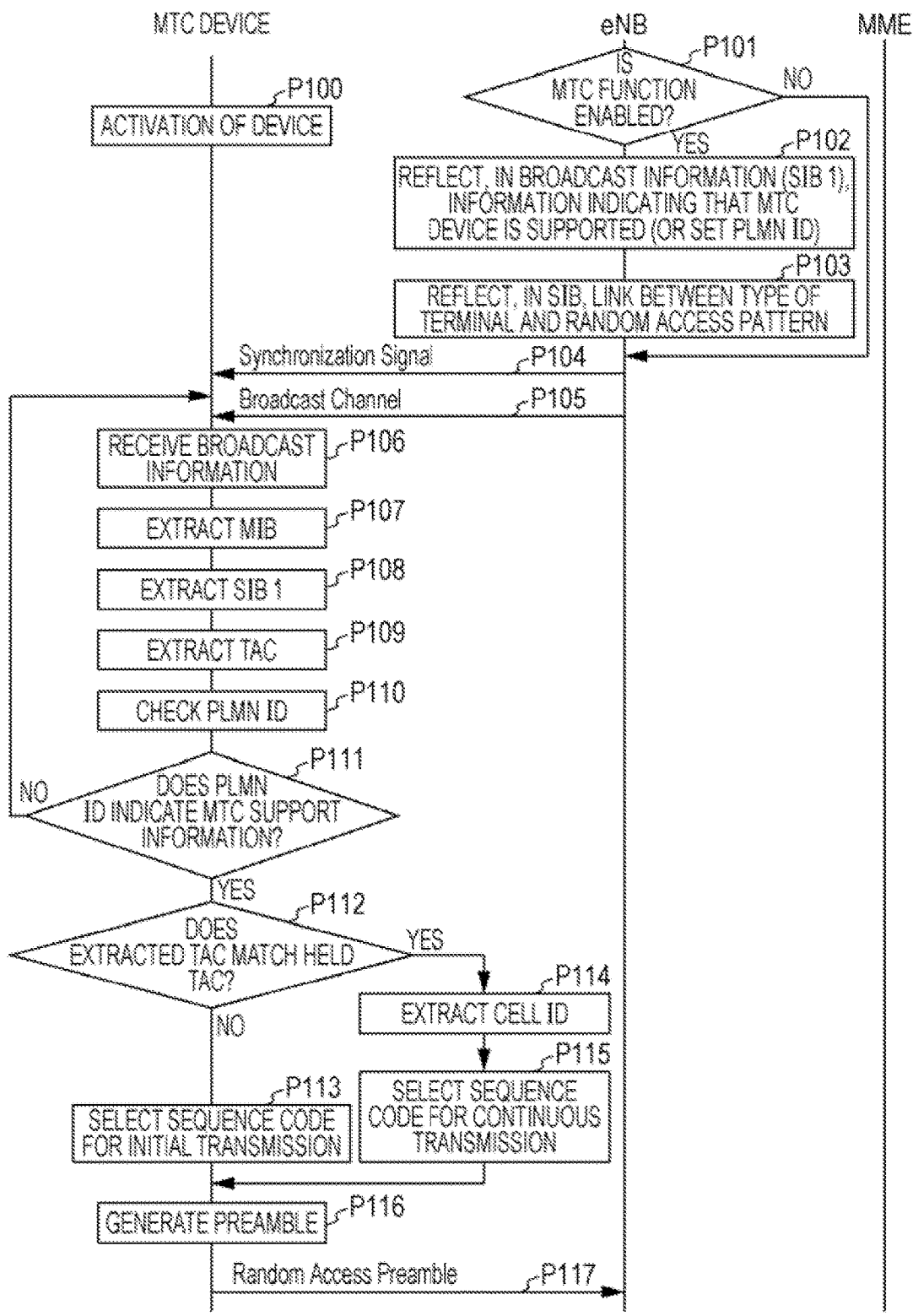
FIG. 7 is a sequence diagram illustrating an example of a process of Identifying an MTC device, according to an embodiment.

As exemplified in FIG. 7, the eNB 20 determines whether or not the eNB 20 supports communication of the MTC device 11 and whether or not an MTC function is enabled (in a process P101).

When the MTC function is enabled (YES in the process P101), the eNB 20 may broadcast, to the radio area 200, Information indicating that the MTC service is supported (in a process P102). When the MTC function is not enabled (NO in the process P101), the eNB 20 may skip the process P102 and a process P103 and transmit a synchronization signal and broadcast Information as normal (in processes P104 and P105).

The information that indicates that the MTC service is supported may be referred to as "MTC support information". A system information block (SIB) may be used to broadcast the MTC support information to the radio area 200.

For SIBs, multiple types are defined. As an example, a system information block type 1 (SIB1) may be used to broadcast the MTC support information. For example, the eNB may use an identifier (PLMN ID), included in the SIB1, of a public land mobile network (PLMN) to broadcast the MTC support information to the cell.

The SIB is an example of the broadcast information, like the aforementioned MIB. The SIB may be transmitted through a physical channel that is different from a physical cannel through which the MIB is transmitted. For example, the MIS may be transmitted through a physical broadcast channel (PBCH), and the SIB may be transmitted through a physical downlink shared channel (PDSCH).

The eNB 20 may link terminal type information with a RA Preamble (also referred to as "RA pattern"). The terminal type information Indicates whether a radio device that tries to be connected to the eNB 20 is an MTC device 11 or UE 10. For example, the eNB 20 may reflect the link in the SIB1 (in the process P103).

The terminal type information may be linked with information indicating whether the transmission by the radio device is "Initial transmission" or "continuous transmission". For example, as illustrated in FIG. 8, it is assumed that, as RA Preambles, patterns of 64 types that have pattern numbers 0 to 63 are ensured for a single cell.

The RA Preambles may be generated by assigning sequence codes (for example, a Zadoff-Chu sequence) to a physical random access channel (PRACH) based on a "RACH root sequence".

Thus, the aforementioned pattern numbers of the RA Preambles may correspond to pattern numbers of the sequence codes. The "pattern numbers of the sequence codes" may be referred to as "sequence numbers". An RA preamble is an example of a connection request including a specific signal sequence.

In this case, the eNB 20 may link RA Preambles having numbers 38 to 63 with RA Preambles that are able to be selected by MTC devices 11. The other preambles having numbers 0 to 37 may be linked as RA Preambles that are able to be selected by radio devices that are not the MTC devices 11. The radio devices that are not the MTC devices 11 may be referred to as "non-MTC devices" and may be UE 10, for example.

In addition, the eNB 20 may link, with the "initial transmission", the RA Preambles that have the numbers 38 to 45 and are among the RA Preambles that have the numbers 38 to 63 and are able to be selected by the MTC devices 11. The eNB 20 may link, with the "continuous transmission", the other RA Preambles having the numbers 46 to 63.

The RA Preamble for the "continuous transmission" may be managed by associating it with an identifier (cell ID) of a cell which is an example of the radio area 200. In other words, when the MTC devices execute the "continuous transmission", the cell ID is not changed and the MTC device may fixedly select RA Preamble associated with the cell ID.

The aforementioned linking (also referred to as "assignment") is an example, and the sequence numbers of the RA Preambles to be linked may not be sequential numbers. As long as the eNB identifies whether a terminal that has accessed the eNB is an MTC device executing the "initial transmission" or an MTC device executing the "continuous transmission", the rule of linking the RA Preambles is arbitrary.

For example, candidates for sequence numbers of RA Preambles that are able to be selected by an MTC device 11 executing the "Initial transmission", and candidates for sequence numbers of RA Preambles that are able to be selected by an MTC device 11 executing the "continuous transmission", may be set in the MTC devices 11 in advance. The eNB 20 may instruct a non-MTC device or UE 10 to select a RA Preamble other than RA preambles having pattern numbers already assigned to MTC devices 11. The eNB 20 may use an SIB to broadcast the instruction to the radio area 200, for example.

When the linking of the RA Preambles is completed, the eNB 20 may transmit the synchronization signal and the broadcast information (the MIB and the SIB) to the radio area 200 (in the processes P104 and P105).

When the MTC device 11 is woken up in the radio area 200 formed by the eNB 20 (in the process P100), the MTC device 11 receives the synchronization signal and the broadcast information from the eNB 20 (in a process P106). The MTC device 11 extracts the MIB and the SIB (SIB1) from the received broadcast information (in processes P107 and P108).

Then, the MTC device 11 extracts a tracking area code (TAC) and the PLMN ID from the extracted SIB1, and determines whether or not the PLMN ID indicates the MTC support information (in processes P109 to P111).

When the PLMN ID does not indicate the MTC support Information as a result of the determination (NO in the process P111), the MTC device 11 causes the process to return to the processes P105 and later. On the other hand, when the PLMN ID indicates the MTC support information (YES in the process P111), the MTC device 11 compares the TAC extracted from the SIB1 with a TAC held by the MTC device 11 and determines whether or not the TAC extracted from the SIB1 matches the TAC held by the MTC device 11 (in a process P112).

When the TAC extracted from the SIB1 does not match the TAC held by the MTC device 11 as a result of the determination (NO in the process P112), the MTC device 11 determines that the RRC connection is not previously established between the MTC device 11 and the eNB 20 and that the MTC device 11 will try to be connected to the eNB 20 (or will execute the "initial transmission").

Based on the determination, the MTC device 11 randomly selects one of sequence codes assigned for the "initial transmission" of the MTC device 11 (in a process P113).

When the TAC extracted from the SIB1 matches the TAC held by the MTC device 11 (YES in the process P112), the MTC device 11 determines that the RRC connection was previously established between the MTC device 11 and the eNB 20 and that the MTC device 11 will try to be connected to the eNB 20 or will execute the "continuous transmission".

Based on the determination, the MTC device 11 extracts the cell ID from the SIB and selects a sequence code of a sequence number associated with the cell ID from among sequence codes of sequence numbers assigned for the "continuous transmission" (in processes P114 and P115). In the aforementioned example, the MTC device 11 selects any of the sequence codes of the sequence numbers 46 to 63.

After selecting a sequence code in the process P113 or P115, the MTC device 11 generates an RA Preamble based on the selected sequence code (in a process P116) and transmits the generated RA Preamble to the eNB 20 (in a process P117).

Figure 9:
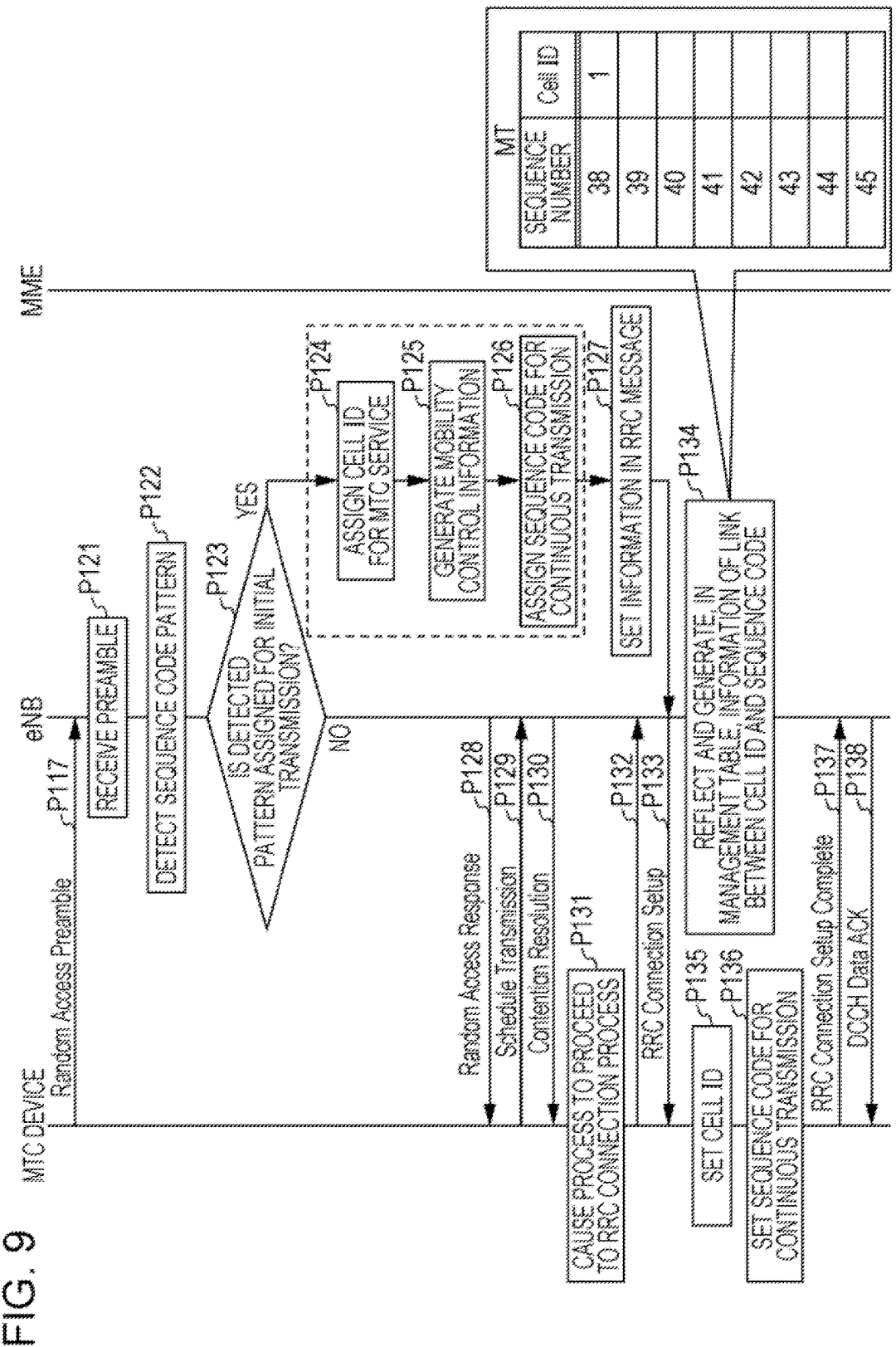
FIG. 9 is a sequence diagram illustrating an example of generation of a management table, according to an embodiment.

As exemplified in FIG. 9, upon receiving the RA Preamble (in a process P121), the eNB 20 detects a pattern of the sequence code used for the generation of the received RA Preamble (in a process P122).

Then, the eNB 20 determines whether or not the detected pattern corresponds to any of patterns (patterns having numbers 38 to 45 in the aforementioned example) assigned for the "initial transmission" of the MTC device 11 (in a process P123).

When the pattern of the sequence code is a pattern assigned for the "initial transmission" (YES in the process P123), the eNB 20 executes processes P124 to P126. The processes P124 to P126 correspond to processes of linking the cell ID with the pattern number of the sequence code and generating a notification message to be transmitted to the MTC device 11.

For example, the eNB 20 assigns the cell ID for the MTC service in the process P124. The "assignment of the cell ID for the MTC service" may be the assignment of an unused ID to the MTC service, while the unused ID Is among a group of IDs that are able to be selected by the eNB 20 as the cell ID and is not IDs defined to be used as defaults.

In the process P125, the eNB 20 generates mobility control information (MCI) to be included in the notification message to be transmitted to the MTC device.

In the process P126, the eNB 20 selects an unassigned pattern number from among candidates for a pattern number, assigned for the "continuous transmission", of a sequence code, and links the selected pattern number with the cell ID assigned in the process P124. The process P125 may be executed after the process P126 is executed.

Then, the eNB 20 sets, in the notification message to be transmitted to the MTC device 11, the MCI and information indicating the link between the pattern number, assigned for the "continuous transmission", of the sequence code and the cell ID assigned for the "continuous transmission" (in a process P127).

As the notification message, an RRC message or an RRC Connection Setup message that is an example of the RRC message may be used, for example.

When the pattern, extracted from the received RA Preamble, of the sequence code is not the pattern assigned for the "Initial transmission" (NO in the process P123), the eNB 20 may execute the RA procedure between the eNB 20 and the MTC device 11 in the same manner as the RA procedure executed between the eNB 20 and the UE 10.

For example, the eNB 20 returns an RA Response to the received RA Preamble to the MTC device 11 (in a process P128).

Upon receiving the RA Response from the eNB 20, the MTC device 11 may transmit a Schedule Transmission message to the eNB 20 (in a process P129). The Schedule Transmission message may include the identifier (ID) of the MTC device that is a source of the Schedule Transmission message.

The eNB 20 receives the Schedule Transmission message and may transmit a Contention Resolution message indicating the success of the RA to the MTC device 11 whose ID was successfully detected by the eNB 20 (in a process P130).

When receiving the Contention Resolution message, the MTC device 11 may cause the process to proceed to the RRC connection process and may transmit an RRC Connection Request message to the eNB 20 (in processes P131 and P132).

Upon receiving the RRC Connection Request message from the MTC device 11, the eNB 20 may transmit, to the MTC device 11, an RRC Connection Setup message including cell setting information to be used to set the RRC connection and the like (in a process P133).

When the transmission of the RA Preamble by the MTC device 11 is the "initial transmission", the Information set in the process P127 is included in the RRC Connection Setup message.

After the transmission of the RRC Connection Setup message, the eNB 20 may cause the process to proceed to a process of registering the MTC device 11 that is a source of the received RA Preamble. For example, the eNB 20 may store Information of the link (association) between the cell ID and the sequence number in a storage device, such as a memory, a storage unit, or a storage medium (in a process P134).

The form of storing the link information is not limited, and the link information may be a management table MT in a table format (or a list format). In the management table MT, a cell ID may be registered in association with each of sequence numbers.

In the "initial transmission" of the MTC device 11, information (for example, an identifier that uniquely identifies the MTC device 11 in the RAN or the like) set by the MTC device 11 is not acquired by the eNB 20. Thus, in a process P134, information managed by the management table MT may be limited to the information of the link between the cell ID and the sequence number.

An example of the identifier that uniquely identifies the MTC device 11 in the RAN may be a global unique temporary identity (GUTI) defined in LTE. The GUTI may be an identifier corresponding to an international mobile subscriber identity (IMSI) or a temporary mobile subscriber identity (TMSI).

Upon receiving the RRC Connection Setup message from the eNB 20, the MTC device 11 sets the RRC connection between the MTC device 11 and the eNB 20 based on the cell setting information such as the cell ID (in a process P135).

In addition, when the received RRC Connection Setup message has the link information set therein, the MTC device 11 may set a sequence code for the "continuous transmission" based on the link information (in a process P136). In the aforementioned example, a sequence code of any of the patterns having the pattern numbers 38 to 45 may be set for the "continuous transmission".

After that, the MTC device 11 transmits an RRC Connection Setup Complete message to the eNB 20 (in a process P137). The RRC Connection Setup Complete message may be transmitted through an UL DCCH, for example.

For example, upon receiving the RRC Connection Setup Complete message through the UL DCCH from the MTC device 11, the eNB 20 may transmit a confirmation response (DCCH Data ACK) message to the MTC device 11 through the DL DCCH (in a process P138).

As described above, the eNB 20 may identify, based on a pattern of a RA Preamble, whether or not a radio device that tried to be connected to the eNB 20 is an MTC device.

Process of Generating and Updating Management Table MT and Process of Holding Message Next, a process of generating and updating the aforementioned management table MT by the eNB 20 and a process of holding details (message) of an Attach Request received from the MTC device 11 are described with reference to FIGS. 10 to 12.

Figure 10:
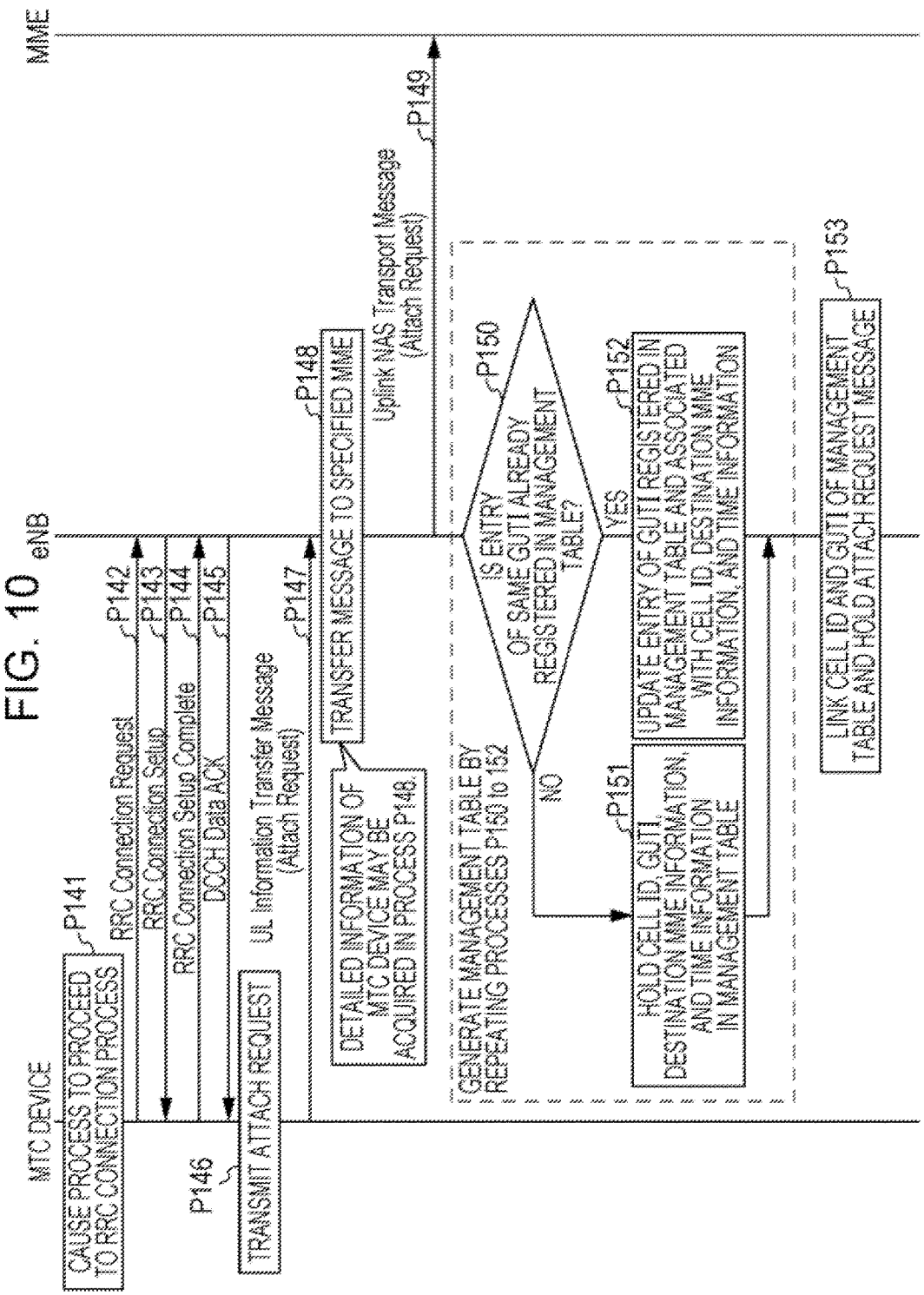
FIG. 10 is a sequence diagram illustrating an example of generation of a management table, according to an embodiment.

First, as exemplified in FIG. 10, the eNB 20 receives an Attach Request from the MTC device 11 that has caused the process to proceed to the attachment process after the RRC connection process (processes P141 to P145) (in processes P146 and P147).

In response to the reception of the Attach Request, the eNB 20 confirms details of the Attach Request and transmits the received Attach Request (NAS message) to the destination MME 50 specified in the Attach Request (in processes P148 and P149).

In the process P148, the eNB 20 may acquire information that has been set by the MTC device 11, such as the GUTI and destination MME information. The eNB 20 references the management table MT based on the acquired GUTI, and determines whether an entry of the same GUTI is already registered in the management table MT (in a process P150).

When the entry of the GUTI is not registered in the management table MT (NO in the process P150) as a result of the determination, the eNB 20 associates the GUTI and the destination MME information with corresponding link information, and registers the GUTI and the destination MME information in the management table MT (in a process P151), as illustrated in FIG. 11. In this case, time information indicating a time at which the eNB 20 received the Attach Request from which the GUTI was acquired may be registered in the management table MT.

The time information may be used to learn, manage, or predict a time and a time interval at which a MTC device 11 (or an MTC device group) identified by the cell ID transmits an Attach Request to the eNB 20.

The time Information may be used to detect and manage the removal of MTC devices 11 from the RAN. For example, the eNB 20 may determine, based on the time information, that an MTC device 11, from which the eNB 20 has not received an Attach Request for a long time, is already removed from the RAN.

When the entry of the GUTI is already registered in the management table MT (YES in the process P150), the eNB 20 updates the entry of the GUTI based on the information acquired from the received Attach Request (in a process P152).

Figure 12:
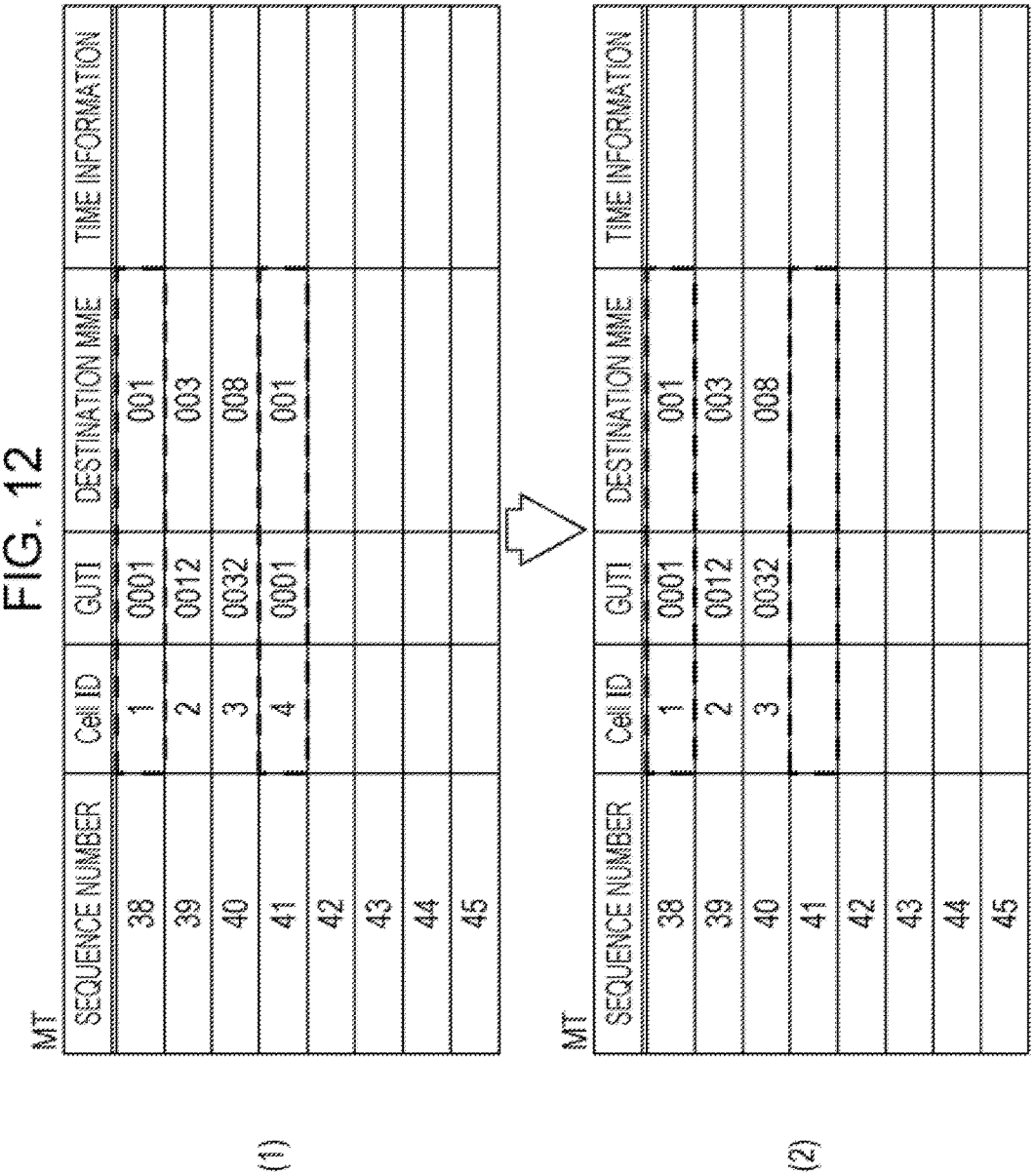
FIG. 12 is a diagram illustrating an example of update of a management table, according to an embodiment.

FIG. 12 describes an example of the update of the management table MT. FIG. 12 illustrates, as an unlimited example, a state in which entries of three GUTIs (0001, 0012, and 0032) are already registered and the eNB 20 has received an Attach Request from an MTC device to which a cell ID 4 was assigned.

A GUTI and destination MME information that are set in the Attach Request may be the same as those in an entry for another cell ID. In the example illustrated in FIG. 12 (1), a GUTI and Information of a destination MME 50 in an entry for a cell ID 1 are the same as a GUTI and information of a destination MME 50 in an entry for the newly registered cell ID 4.

In this case, as exemplified in FIG. 12 (2), the eNB 20 may consolidate (merge) the entry for the cell ID 4 into the entry for the cell ID 1. In this case, an MTC device 11 that is a source of an Attach Request and corresponds to the cell ID 4 of the entry that has been aggregated into the entry for the cell ID 1, and an MTC device 11 that is a source of an Attach Request and corresponds to the cell ID 1 of the entry into which the entry for the cell ID 4 is aggregated, may form an MTC device group.

In other words, in the management table MT, the MTC devices 11 that transmitted the Attach Requests including the same GUTI and the same destination MME information may be managed as the single group.

As for Attach Requests having the same GUTI and the same destination MME information, the eNB 20 may transmit an Attach Request previously received and held to the destination MME 50 on behalf of the MTC devices 11, before receiving an Attach Request from the MTC devices 11. Thus, in the management table MT, it is unnecessary to identify which MTC devices 11 belong to the single MTC device group.

In response to the registration or update of the management table MT, the eNB 20 holds, in the memory or the like, details of Attach Request messages received from MTC devices while linking cell IDs and GUTIs of the management table MT with the details of the Attach Request messages (in a process P153).

As described above, the eNB 20 uses the management table MT to manage MTC devices 11 that have transmitted Attach Requests to the eNB 20, and stores details of Attach Request messages that may be subjected to the substitute transmission, in preparation for the substitute transmission of Attach Request messages.

Attachment Process after Completion of Registration

Next, the process of newly attaching an MTC device 11 of which information has been already registered in the management table MT or newly attaching an MTC device 11 that previously transmitted an Attach Request to the eNB 20, as described above, is described with reference to FIGS. 13 and 14.

Briefly speaking, the eNB 20 manages, based on the management table MT, MTC devices 11 as a group for which the eNB 20 transmits Attach Requests (or executes the substitute transmission) before receiving Attach Requests from the MTC devices 11.

Then, the eNB 20 transmits, to the target MME 50, Attach Requests messages previously received and held, which are identified based on patterns of sequence codes of RA Preambles corresponding to the group to be subjected to the substitute transmission, on behalf of MTC devices 11.

Figure 13:
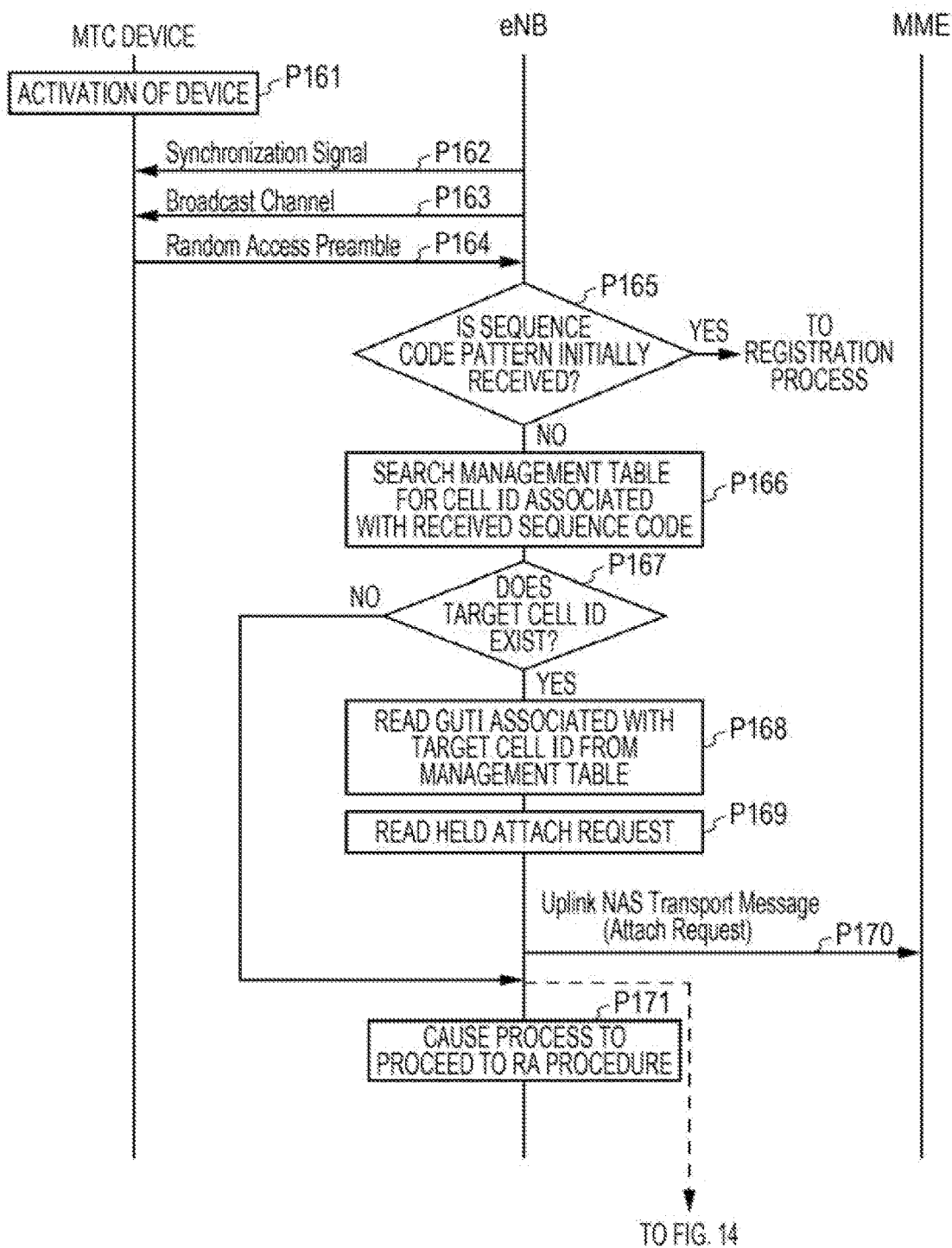
FIG. 13 is a sequence diagram illustrating an example of an attachment process, according to an embodiment.

As exemplified in FIG. 13, in response to the wakeup of the MTC device 11 (in the process P161), the MTC device 11 starts the RA procedure between the MTC device 11 and the eNB 20, and transmits an RA Preamble to the eNB 20 (in processes P162 to P164).

Upon receiving the RA Preamble, the eNB 20 detects a pattern of a sequence code used for the generation of the received RA Preamble, and determines whether or not the detected pattern is any of patterns assigned for the "initial transmission" (in a process P165).

When the pattern of the sequence code is any of the patterns assigned for the "Initial transmission" (YES in the process P165) as a result of the determination, the eNB 20 may execute the process of registering the MTC device 11 in the management table MT exemplified in FIGS. 10 and 11, for example.

On the other hand, when the pattern of the sequence code is a pattern assigned for the "continuous transmission" (NO in the process P165), the eNB 20 references the management table MT, and determines whether or not a cell ID associated with a pattern number of the sequence code is already registered in the management table MT (in processes P166 and P167).

When the cell ID is already registered (YES in the process P167), the eNB 20 reads, from the management table MT, a GUTI and destination MME information that are associated with the cell ID (in a process P168). Then, the eNB 20 reads details of an Attach Request message corresponding to the read GUTI from the memory or the like (in a process P169).

The eNB 20 sets the read details of the message in an Attach Request read from the management table MT and to be transmitted to the destination MME 50, and transmits the Attach Request to the destination MME 50 on behalf of the MTC device 11 (in a process P170).

In other words, the eNB 20 transmits the stored Attach Request to the destination MME 50 in response to the detection or reception of the RA Preamble having the specific pattern, indicating the "continuous transmission", of the sequence code, without waiting to receive from the MTC device 11 an Attach Request scheduled to be received after the detection.

The MME 50 normally receives the Attach Request that has been transmitted by the eNB 20 on behalf of the MTC device 11, and may transmit a request to connect a session to the S-GW 30, as exemplified in FIG. 5. Thus, the bearer between the MTC device 11 and the core network including the P-GW 40 and the SCS 80 is established.

In addition, since the destination MME 50, to which the Attach Request that has been transmitted by the eNB 20 on behalf of the MTC device 11 is directed, is not changed and the GUTI of the Attach Request Is not changed, an Update Location Request is not provided by the MME 50 to the HSS 60. Thus, congestion of Update Location Requests to be transmitted to the HSS 60 may be avoided or suppressed.

When the cell ID is not registered in the management table MT (NO in the process P167), the eNB 20 may skip the processes P168 to P170.

Figure 14:
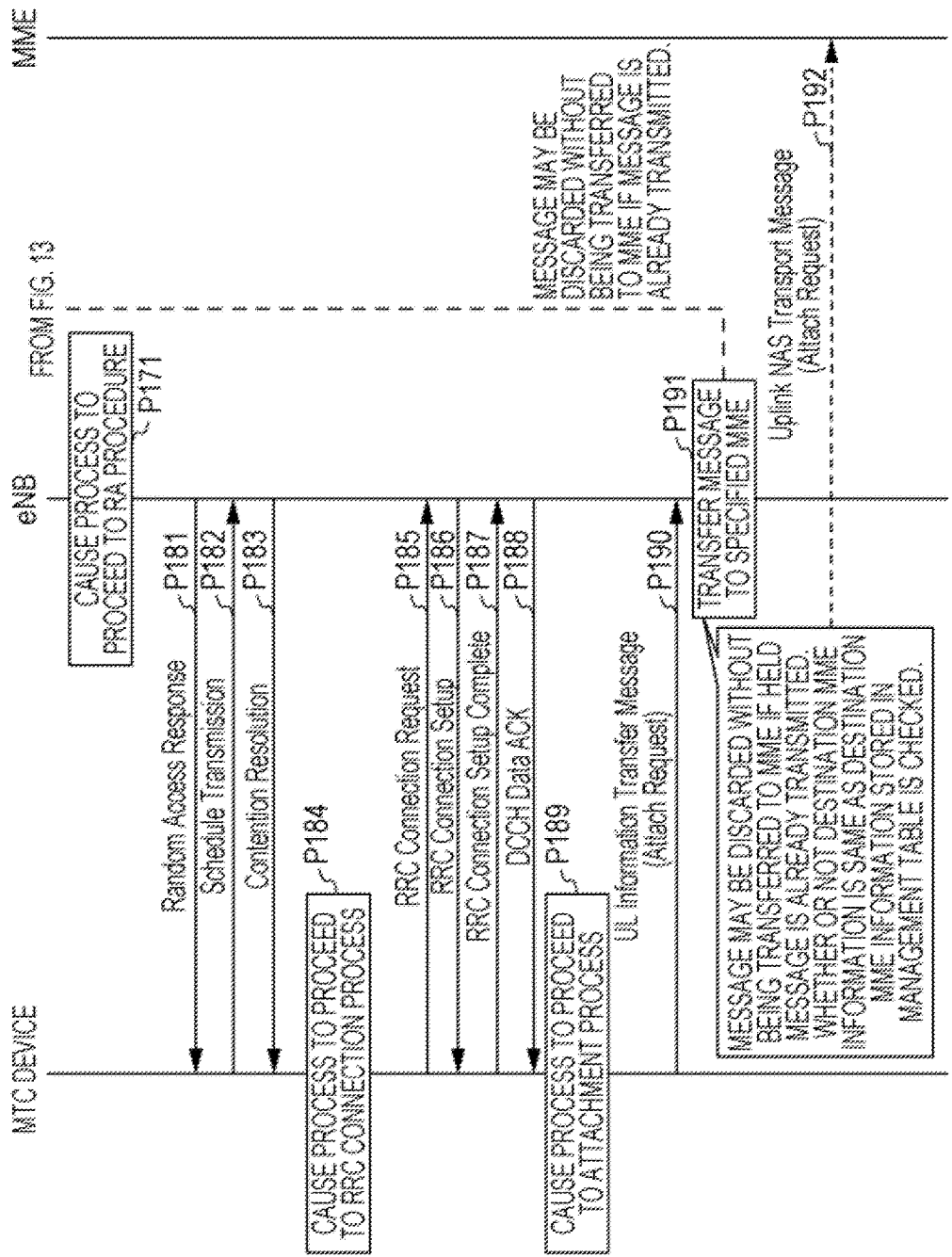
FIG. 14 is a sequence diagram illustrating an example of an attachment process, according to an embodiment.

After that, the eNB 20 causes the process to proceed to the RA procedure (in a process P171), transmits an RA Response to the MTC device 11, receives a Schedule Transmission message from the MTC device 11, and transmits a Contention Resolution message to the MTC device 11 (in processes P181 to P183), as exemplified in FIG. 14.

Upon receiving the Contention Resolution message, the MTC device 11 causes the process to proceed to the RRC connection process (in a process P184). For example, the MTC device 11 transmits an RRC Connection Request message to the eNB 20, receives an RRC Connection Setup message from the eNB 20, transmits an RRC Connection Setup Complete message to the eNB 20, and receives a DCCH Data ACK message from the eNB 20 (in processes P185 to P188).

In response to the reception of the DCCH Data ACK message from the eNB 20, the MTC device 11 causes the process to proceed to the attachment process and transmits an Attach Request to the eNB 20 (in processes P189 and P190).

Upon receiving the Attach Request, the eNB 20 may reference the management table MT and confirm (or check), based on details of the received Attach Request, whether or not the details and destination MME 50 information of the received Attach Request message are the same as details and destination MME 50 information of the Attach Request message that has been transmitted on behalf of the MTC device 11 in the process P170 illustrated in FIG. 13.

When the details and the destination MME 50 information of the received Attach Request message are the same as the details and destination MME 50 information of the Attach Request message that has been transmitted in the process P170, the eNB 20 may discard the received Attach Request without transmitting the Attach Request to the destination MME 50 (in a process P191). Thus, congestion of Attach Requests to be transmitted to the MME 50 may be suppressed or avoided.

When the details and the destination MME 50 information of the received Attach Request are not the same as the details and destination MME 50 information of the Attach Request that has been transmitted in the process P170, the eNB 20 may transmit the details of the received Attach Request message to the destination MME 50 as normal (in a process P192). In addition, as exemplified by dotted arrows illustrated in FIGS. 13 and 14, when the cell ID is not registered in the management table MT (NO in the process P167 Illustrated in FIG. 13), the eNB 20 may transmit the details of the Attach Request message received in the process P190 to the destination MME 50 (in the process P192).

As described above, according to the aforementioned embodiment, an MTC device 11, from which the eNB 20 previously received an Attach Request to be directed to the same MME 50, is identified and managed by the eNB 20. Then, when the MTC device 11 managed by the eNB 20 tries to be connected to the eNB 20 again (or executes RA, for example), the eNB 20 transmits an Attach Request to the MME 50 on behalf of the MTC device 11 before receiving the Attach Request from the MTC device 11.

Thus, even if the number of MTC devices 11 to be connected to the single eNB 20 increases, a frequency at which an Attach Request is transmitted to the MME 50 may be reduced, and congestion of Attach Requests may be suppressed or avoided. As a result, a process load of the RAN may be reduced.

In addition, the eNB 20 may transmit an Attach Request to the MME 50 on behalf of the MTC device 11 before the termination of the RA procedure between the eNB 20 and the MTC device 11 or before the start or completion of the RRC connection process between the eNB 20 and the MTC device 11.

Thus, the MME 50 may quickly start to set a session (connection) between the MTC device 11 and the SCS 80 through the S-GW 30 and the P-GW 40 without waiting for the RRC connection process between the MTC device 11 and the eNB 20. Thus, the MTC device 11 may quickly start to communicate with the SCS 80 based on the MTC service (or the MTC application), for example.

As described above, according to the aforementioned embodiment, since multiple MTC devices 11 providing MTC services communicate with the higher-level network nodes through the eNB 20, congestion of Attach Requests concurrently transmitted may be suppressed or avoided. Thus, the load of the RAN may be reduced.

Modified Examples

Next, modified examples of the aforementioned embodiment are described with reference to FIGS. 15 and 16. In the modified examples, the eNB 20 transmits Attach Requests to the MME 50 on behalf of MTC devices 11, broadcasts, to the radio area 200, information indicating that the eNB 20 transmitted the Attach Requests to the MME 50 on behalf of the MTC devices 11, and the MTC devices 11 may skip the attachment process and start a next process.

Figure 15:
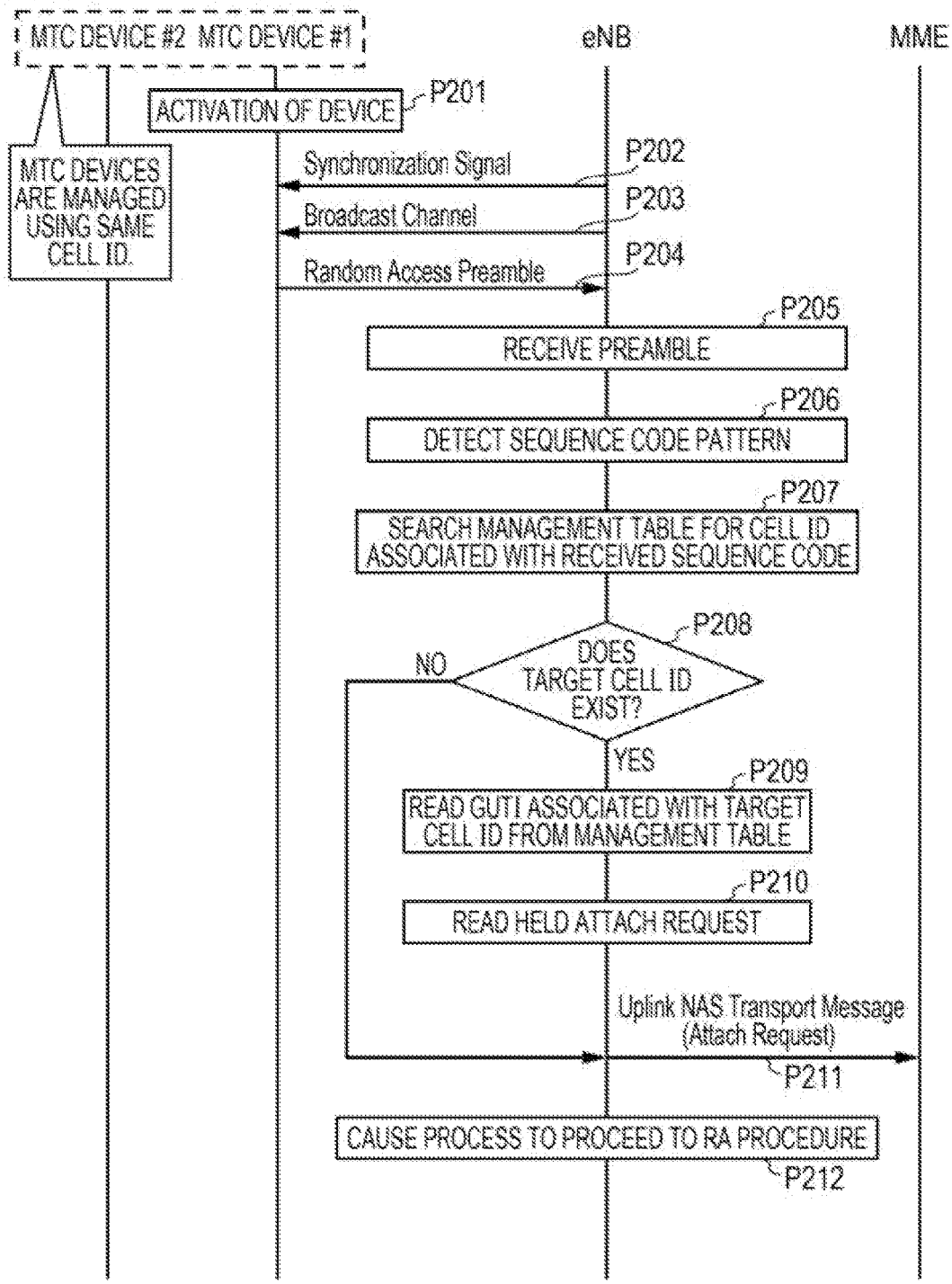
FIG. 15 is a sequence diagram illustrating an example of modification, according to an embodiment.
Figure 16:
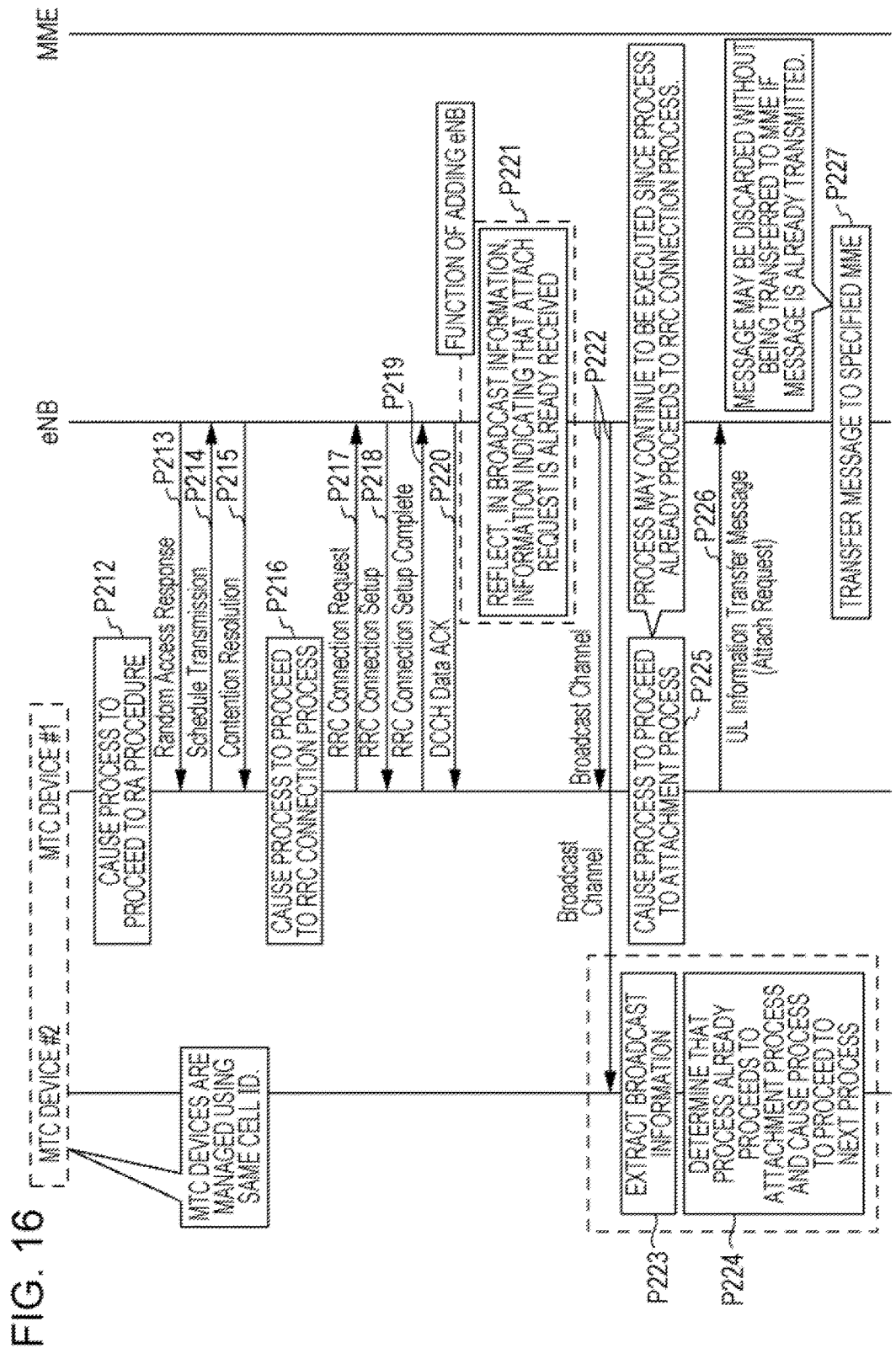
FIG. 16 is a sequence diagram illustrating an example of modification, according to an embodiment.

The examples illustrated in FIGS. 15 and 16 assume that multiple (2, for example) MTC devices (#1 and #2) are able to be connected to the eNB 20 and that the eNB 20 manages the MTC devices 11 as a group using the same cell ID.

First, as exemplified in FIG. 15, in response to the wakeup of the MTC device #1 (in a process P201), the MTC device #1 starts the RA procedure between the MTC device #1 and the eNB 20, and transmits an RA Preamble to the eNB 20 (In processes P202 to P204).

Upon receiving the RA Preamble (in a process P205), the eNB 20 detects a pattern of a sequence code used for the generation of the received RA Preamble (in a process P206).

Then, the eNB 20 references the management table MT and determines whether or not a cell ID associated with a pattern number of the detected sequence code is already registered in the management table MT (in processes P207 and P208).

When the cell ID is already registered (YES in the process P208), the eNB 20 reads, from the management table MT, a GUTI and destination MME information that are associated with the cell ID (in a process P209). Then, the eNB 20 reads details, associated with the GUTI, of an Attach Request message from the memory or the like (in a process P210).

The eNB 20 sets the read details in an Attach Request to be transmitted to the destination MME 50 indicated by the destination MME information read from the management table MT, and transmits the Attach Request to the destination MME 50 on behalf of the MTC device 11 (in a process P211).

The MME 50 normally receives the Attach Request that has been transmitted by the eNB 20 on behalf of the MTC device 11, and may transmit a request to connect a session to the S-GW 30, as exemplified in FIG. 5. Thus, the bearer between the MTC device 11 and the core network including the P-GW 40 and the SCS 80 is established.

The eNB 20 may cause the process to proceed to the RA procedure after the substitute transmission of the Attach Request to the MME 50 (in a process P212). When the cell ID is not registered in the management table MT (NO in the process P208), the eNB 20 may skip the processes P209 to P211, and cause the process to proceed to the RA procedure (in a process P212).

For example, as Illustrated in FIG. 16, the eNB 20 may transmit an RA Response to the MTC device #1, receive a Schedule Transmission message from the MTC device #1, and transmit a Contention Resolution message to the MTC device #1 (in processes P213 to P215).

Upon receiving the Contention Resolution message, the MTC device #1 may cause the process to proceed to the RRC connection process (in a process P216). For example, the MTC device #1 may transmit an RRC Connection Request message to the eNB 20, receive an RRC Connection Setup message from the eNB 20, transmit an RRC Connection Setup Complete message to the eNB 20, and receive a DCCH Data ACK message from the eNB 20 (in processes P217 to P220).

The eNB 20 may broadcast, to the radio area 200 through a broadcast channel, information Indicating that the eNB 20 has transmitted the Attach Request to the MME 50 on behalf of the MTC device 11 (in processes P221 and P222). In this case, the eNB 20 may use an SIB to broadcast the information.

When the MTC device #2 that belongs to the same MTC device group as the MTC device #1 is woken up, the MTC device #2 receives a signal through the broadcast channel from the eNB 20, and extracts the broadcast Information from the signal (in a process P223).

The MTC device #2 may recognize, from the extracted broadcast information, that the eNB 20 has already transmitted the Attach Request on behalf of the MTC device #1. Thus, the MTC device #2 may skip the attachment process and cause the process to proceed to a next process (in a process P224).

Since the MTC device #2 may skip the attachment process, a process load of the MTC device #2 may be reduced.

Since the MTC device #1 receives the DCCH Data ACK message and completes the RRC connection process in the process P220, the MTC device #1 may cause the process to proceed to the attachment process and transmit an Attach Request to the eNB 20 (in processes P225 and P226).

Upon receiving the Attach Request from the MTC device #1, the eNB 20 may execute the same processes as the processes P191 and P192 Illustrated in FIG. 14. For example, the eNB 20 may reference the management table MT and confirm (or check) whether or not details and destination MME information of the received Attach Request are the same as those registered in the management table MT. When the details and destination MME information of the received Attach Request are the same as those registered in the management table MT, the eNB 20 may discard the Attach Request (in a process P227). Thus, congestion of Attach Requests to be transmitted to the MME 50 may be suppressed or avoided.

Examples of Configurations of eNB and MTC Device

Figure 17:
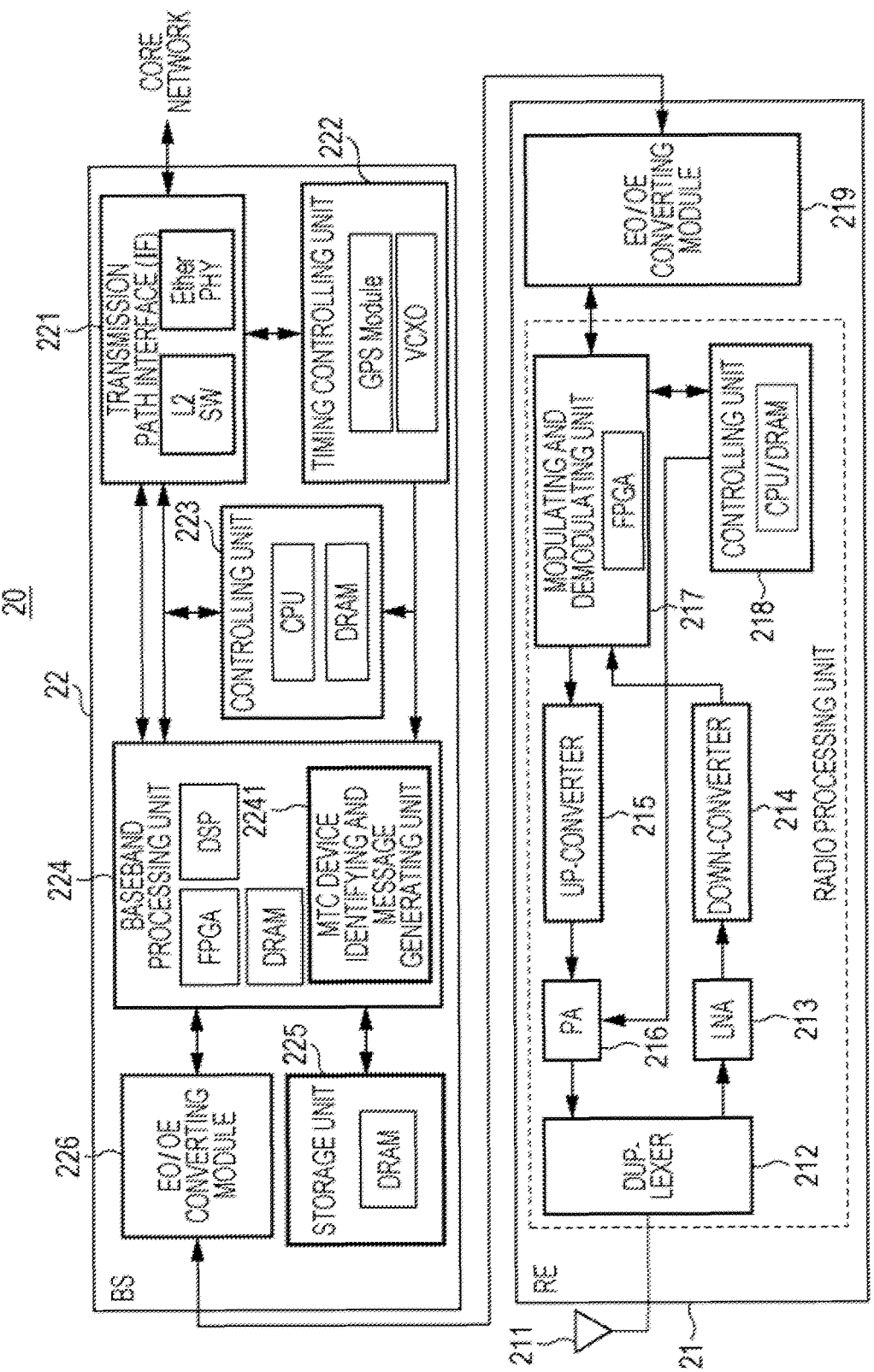
FIG. 17 is a block diagram illustrating an example of a configuration of a base station (eNB), according to an embodiment.
Figure 18:
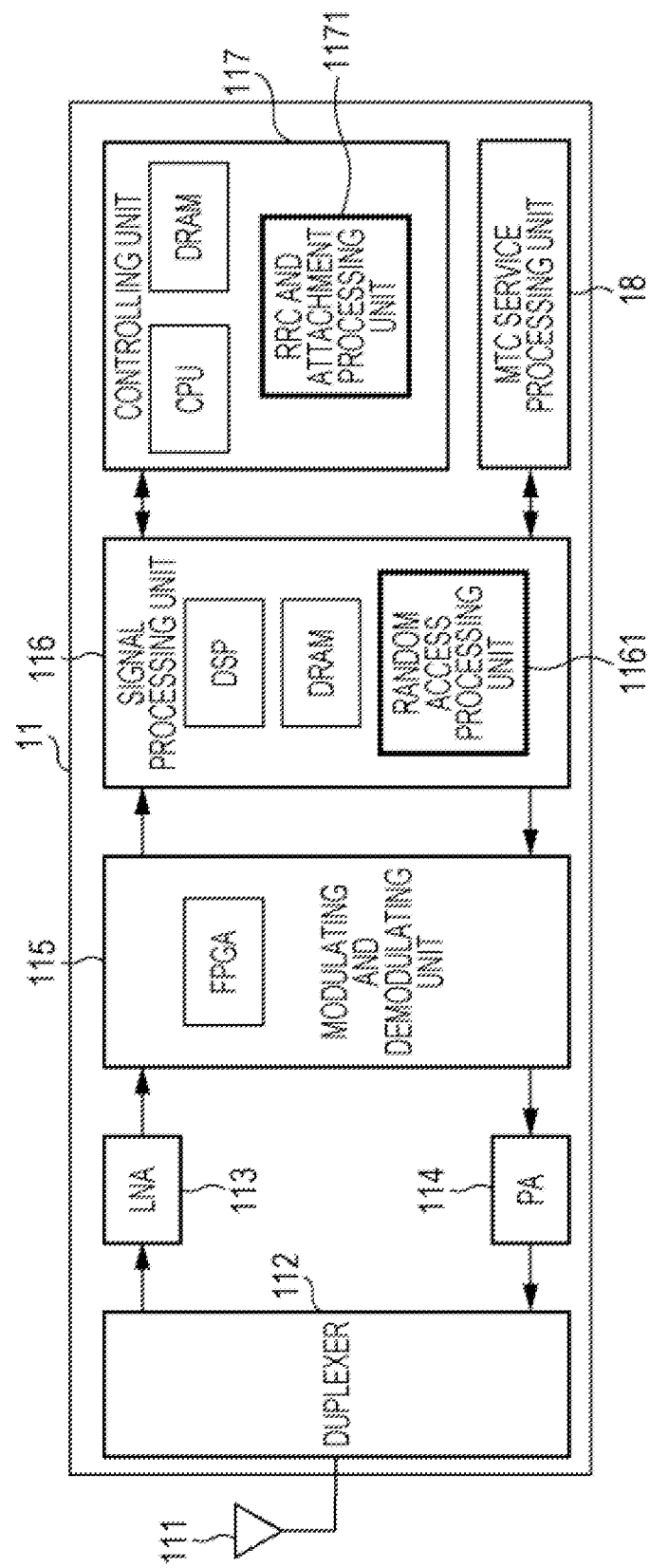
FIG. 18 is a block diagram illustrating an example of a configuration of an MTC device, according to an embodiment.

Next, examples of configurations of the aforementioned eNB 20 and MTC device 11 are described with reference to FIGS. 17 and 18. FIG. 17 is a block diagram illustrating the example of the configuration of the eNB 20, while FIG. 18 is a block diagram illustrating the example of the configuration of the MTC device 11.

Example of Configuration of eNB

For example, the eNB 20 illustrated in FIG. 17 may include the RE 21 and the BS 22 that are separated from each other, as illustrated in FIG. 1. The RE 21 and the BS 22 that are included in the eNB 20, however, may be unified.

For example, the RE 21 may include an antenna 211, a duplexer 212, a low noise amplifier (LNA) 213, a down-converter 214, an up-converter 215, and a power amplifier (PA) 216. The RE 21 may also include a modulating and demodulating unit 217, a controlling unit 218, and an electrical-to-optical and optical-to-electrical (abbreviated as EO/OE) converting module 219.

For example, the BS 22 may include a transmission path interface (I/F) 221, a timing controlling unit 222, a controlling unit 223, a baseband processing unit 224, a storage unit 225, and an EO/OE converting module 226.

The antenna 211 of the RE 21 transmits and receives radio signals that form the radio area 200.

The duplexer 212 separates a radio signal to be transferred to the antenna 211 from the PA 216 and a radio signal to be transferred to the LNA 213 from the antenna 211.

The LNA 213 low-noise amplifies the received radio signal input from the duplexer 212 and outputs the amplified radio signal to the down-converter 214.

The down-converter 214 converts (down-converts) the received radio signal amplified by the LNA 213 into a baseband signal and outputs the baseband signal to the modulating and demodulating unit 217.

The up-converter 215 converts (up-converts) a baseband signal modulated by the modulating and demodulating unit 217 into a radio signal to be transmitted, and outputs the converted radio signal to the PA 216.

The PA 216 amplifies the radio signal received from the up-converter 215 so as to cause the radio signal to have predetermined transmission power. The radio signal amplified by the PA 216 is transmitted by the antenna 211 into air through the duplexer 212.

The modulating and demodulating unit 217 modulates transmission data input from the EO/OE converting module 219 so as to generate a baseband signal to be transmitted, and outputs the baseband signal to the up-converter 215. In addition, the modulating and demodulating unit 217 demodulates the received baseband signal input from the down-converter 214, and outputs received data to the EO/OE converting module 219.

A modulation method and a demodulation method that are compatible with a radio communication system between the eNB 20 and UE 10 or between the eNB 20 and MTC devices may be applied to the modulation and the demodulation executed by the modulating and demodulating unit 217. For example, when the radio communication conforms to LTE or LTE-Advanced, an orthogonal modulation and demodulation method such as orthogonal frequency-division multiplexing (OFDM) may be applied to the modulating and demodulating unit 217.

The modulating and demodulating unit 217 may include a function of processing (terminating or the like) signals that are transmitted and received through the CPRI that is an example of the optical interface with the BS 22. The modulating and demodulating unit 217 may be achieved using a field programmable gate array (FPGA), for example.

The controlling unit 218 comprehensively controls operations of the RE 21. The control may include control of the modulation and demodulation processes by the modulating and demodulating unit 217, control of an amplification rate of the PA 216, and the like. The controlling unit 218 may be achieved using a processor having computing power and a storage unit such as a memory, for example.

An example of the processor is a central processing unit (CPU). An example of the memory is a dynamic random access memory (DRAM). Applicable examples of the processor and memory, however, are not limited to these examples.

The EO/OE converting module 219 is connected to the EO/OE converting module 226 of the BS 22 through an optical fiber, and transmits and receives optical signals to and from the EO/OE converting module 226 of the BS 22 through the optical fiber.

For example, the EO/OE converting module 219 converts an optical signal received from the BS 22 into an electric signal (optical-to-electric (OE) conversion), and converts an electric signal to be transmitted to the BS 22 into an optical signal (electric-to-optical (EO) conversion).

A signal received from the BS 22 and converted into an electric signal may include the transmission data and be input to the modulating and demodulating unit 217. An electric signal converted into an optical signal and to be transmitted to the BS 22 may be input from the modulating and demodulating unit 217 and include the received data demodulated by the modulating and demodulating unit 217.

In the BS 22, the transmission path interface 221 processes signals that are transmitted and received between the BS 22 and the core network, for example. The transmission path interface 221 may include a Layer 2 switch (L2SW), an interface for processing a physical layer of an Ethernet (registered trademark) network, and the like.

The timing controlling unit 222 controls operational timings of the overall BS 22, for example. For example, the timing controlling unit 222 may control operational timings of the baseband processing unit 224 and controlling unit 223.

The operational timings may be controlled based on a standard clock signal generated by a voltage-controlled oscillator (VCXO). The standard clock signal may be corrected based on information of the position of the BS 22. The information of the position of the BS 22 may be acquired by a global positioning system (GPS) module, for example.

The baseband processing unit 224 executes a baseband process on signals that are transmitted and received between the transmission path Interface 221 and the RE 21, for example. The baseband process may include a digital modulation and demodulation process, encoding and decoding to be executed using an error correction signal, and the like, for example.

The baseband processing unit 224 may include an MTC device identifying and message generating unit 2241, for example. The MTC device identifying and message generating unit 2241 may generate, based on data stored in the storage unit 225, messages that are used for the aforementioned process of identifying the MTC device, the aforementioned RA procedure, the RRC connection process, the attachment process, and the like.

Thus, the data stored in the storage unit 225 may include the aforementioned management table MT, data and a program that are used for the MTC device identifying and message generating unit 2241 to execute the aforementioned processes, and the like. The storage unit 225 may be a memory, and an example of the memory is a DRAM.

The baseband processing unit 224 that includes the MTC device identifying and message generating unit 2241 may be implemented by using an FPGA, a digital signal processor (DSP), a DRAM, and the like, for example.

The controlling unit 223 may comprehensively control overall operations of the BS 22, for example. For example, the controlling unit 223 may control the transmission and reception of digital signals between the transmission path interface 221 and the baseband processing unit 224.

The EO/OE converting module 226 of the BS 22 is connected to the EO/OE converting module 219 of the RE 21 through the optical fiber, as described above. The EO/OE converting module 226 transmits and receives optical signals to and from the EO/OE converting module 219 of the RE 21 through the optical fiber.

For example, the EO/OE converting module 226 converts an optical signal received from the RE 21 into an electric signal (optical-to-electric (OE) conversion), and converts an electric signal to be transmitted to the RE 21 into an optical signal (electric-to-optical (EO) conversion).

The signal received from the RE 21 and converted into the electric signal may include the received data demodulated by the modulating and demodulating unit 217 of the RE 21 and is input to the baseband processing unit 224, for example. The electric signal converted into the optical signal and to be transmitted to the RE 21 is input from the baseband processing unit 224 and may include the transmission data modulated by the modulating and demodulating unit 217 of the RE 21.

Example of Configuration of MTC Device

As illustrated in FIG. 18, the MTC device 11 may include an antenna 111, a duplexer 112, an LNA 113, a PA 114, a modulating and demodulating unit 115, a signal processing unit 116, a controlling unit 117, and an MTC service processing unit 118, for example.

The antenna 111 transmits and receives radio signals to and from the eNB 20, for example.

The duplexer 112 separates a radio signal to be transferred to the antenna 111 from the PA 114 and a radio signal to be transferred to the LNA 113 from the antenna 111.

The LNA 113 low-noise amplifies the radio signal input from the duplexer 112 and outputs the amplified radio signal to the modulating and demodulating unit 115.

The PA 114 amplifies a radio signal received from the modulating and demodulating unit 115 and to be transmitted so as to cause the radio signal to have predetermined transmission power. The radio signal amplified by the PA 114 is transmitted by the antenna 111 into air through the duplexer 112.

The modulating and demodulating unit 115 may include a down-converter configured to convert the radio signal received from the LNA 113 into a baseband signal, and an up-converter configured to convert a baseband signal to be transferred to the PA 114 into a radio signal to be transmitted.

The modulating and demodulating unit 115 modulates the transmission data received from the signal processing unit 116, up-converts a modulated signal into a radio signal to be transmitted, and outputs the converted radio signal to the PA 114. In addition, the modulating and demodulating unit 115 demodulates the received signal that has been input from the LNA 113 and down-converted into a baseband signal, and outputs received data to the signal processing unit 116.

A modulation method and a demodulation method that are compatible with a radio communication system between the MTC device 11 and the eNB 20 may be applied to the modulation and the demodulation executed by the modulating and demodulating unit 115. For example, when the radio communication conforms to LTE or LTE-Advanced, an orthogonal modulation and demodulation method such as OFDM may be applied to the modulating and demodulating unit 115. The modulating and demodulating unit 115 may be implemented by an FPGA, for example.

The signal processing unit 116 executes digital signal processing on data to be transmitted to the modulating and demodulating unit 115 and the data received from the modulating and demodulating unit 115, for example. The signal processing unit 116 may include a random access (RA) processing unit 1161. The aforementioned RA procedure between the MTC device 11 and the eNB 20 may be executed by the RA processing unit 1161.

The signal processing unit 116 that includes the RA processing unit 1161 may be Implemented by using a DSP and a DRAM, for example.

The controlling unit 117 may comprehensively control overall operations of the MTC device 11, for example. The control may include control of the digital signal processing by the signal processing unit 116. The controlling unit 117 may include an RRC and attachment processing unit 1171. The aforementioned RRC connection process and the attachment process may be executed between the MTC device 11 and the eNB 20 by the RRC and attachment processing unit 1171.

The MTC service processing unit 118 executes a process based on the MTC service. The process may include operations for causing the MTC device 11 to be woken up and be in a sleep state, a communication process that is executed based on the MTC service between the MTC device 11 and the SCS 80 after the process of attaching the MTC device 11 to the RAN, and the like.

The communication process based on the MTC service may include a process of transmitting information sensed or measured by a sensor, a meter, or the like to the SCS 80. Thus, the MTC service processing unit 118 may include the sensor, the meter, or the like (not illustrated).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A base station comprising:
   a memory configured to store an attach request for registering a radio device in a radio access network, the attach request being received from the radio device; and
   a processor configured to:
      form a wireless communication area in the radio access network,
      receive a random access preamble from another radio device located in the wireless communication area,
      in response to a detection of the random access preamble, initiate a random access procedure,
      upon reception of a radio resource control (RRC) connection request from the radio device, initiate an RRC connection process, and
      upon reception of the attach request from the radio device, transfer the attach request to a higher-level network node, wherein
      when the radio device is a first machine-type communication (MTC) device configured to provide an MTC service, the processor is configured to, upon reception of the attach request from the MTC device, transfer the received attach request to the higher-level network node while storing the received attach request in the memory, and the random access procedure includes:
         when the another radio device is a second MTC device and upon reception of the random access preamble from the second MTC device providing a same MTC service as the first MTC device that previously transmitted the attach request to the base station, transmitting the attach request stored in the memory to the higher-level network node on behalf of the second MTC device without waiting for reception of a second attach request from the second radio device.

2. The base station of claim 1, wherein
   the MTC device is assigned a specific signal sequence to be included in the random access preamble; and
   the random access procedure includes:
      reading, in response to a detection of the specific signal sequence, the attach request stored in the memory and transmitting the read attach request to the higher-level network node.

3. The base station of claim 1, wherein
   multiple MTC devices are located in the wireless communication area; and
   the processor is further configured to:
      upon detecting that destinations of attach requests received from the multiple MTC devices are destined for an identical higher-level network node, manage the multiple MTC devices as a group, and
      transfer a first one of the attach requests to the identical higher-level network node without transferring the other attach requests to the identical higher-level network node.

4. A radio device to be coupled to a base station in a wireless communication area formed by the base station in a radio access network, the radio device comprising:
   a memory that stores instructions for transmitting a random access preamble to the base station; and
   a processor configured to:
      set a specific signal sequence in the random access preamble, the specific signal sequence indicating that the radio device is a machine-type communication (MTC) device configured to provide a MTC service,
      transmit the random access preamble including the specific signal sequence to the base station, wherein the specific signal sequence is configured to enable the base station to, in response to the detection of the specific signal sequence, initiate a random access procedure,
      transmit a radio resource control (RRC) connection request to the base station to cause the base station to initiate an RRC connection process, and
      after receiving, from the base station, information indicating that the RRC connection process is completed, transmit the attach request for registering the radio device in the radio access network to the base station to cause the base station to hold the attach request in the base station, wherein the random access procedure of the base station including:
         upon reception of the random access preamble including the specific signal sequence from a second radio device providing a same MTC service the first radio device that previously transmitted the attach request to the base station, transmitting the attach request held in the base station to a higher-level network node without waiting for reception of a second attach request from the second radio device.

5. The radio device of claim 4, wherein
   upon receiving, from the base station, information indicating that the first attach request is already transmitted to the higher-level network node, the processor skips processing of transmitting the second attach request to the base station.

6. A radio communication system comprising:
   a base station including a first memory and a first processor coupled to the first memory, the first processor being configured to form a wireless communication area in a radio access network; and a radio device including a second memory and a second processor coupled to the second memory, the second processor being configured to transmit a random access preamble, a radio resource control (RRC) connection request, and an attach request for registering the radio device in the radio access network to the base station, wherein the second processor is configured to set a specific signal sequence in the random access preamble, the specific signal sequence indicating that the radio device is a machine-type communication (MTC) device configured to provide a MTC service; and the first processor of the base station is configured to:
  receive, from the radio device located in the wireless communication area, the random access preamble including the specific signal sequence,
  in response to the detection of the specific signal sequence, initiate a random access procedure,
  upon reception of a radio resource control (RRC) connection request from the radio device, initiate an RRC connection process, and
  upon reception of the attach request from the radio device, transfer the attach request to a higher-level network node while storing the received attach request in the first memory, wherein
  the random access procedure includes:
    when the random access preamble including the specific signal sequence is received from a second radio device providing a same MTC service as the first radio device after the attach request was received from the first radio device, transmitting the first attach request stored in the first memory to the higher-level network node without waiting for reception of a second attach request from the second radio device.

7. A radio communication control method comprising:
receiving, at a base station, a random access preamble including from a radio device located in a wireless communication area formed by the base station in a radio access network, the random access preamble including a specific signal sequence indicating that the radio device is a machine-type communication (MTC) device configured to provide a MTC service;
initiating, by the base station and in response to a detection of the specific signal sequence, a random access procedure,
upon reception of a radio resource control (RRC) connection request from the radio device, initiating an RRC connection process,
upon reception of an attach request for registering the radio device in the radio access network from the radio device, transferring the received attach request to a higher-level network node while storing the received attach request in the memory, wherein the random access procedure includes:
  when the random access preamble including the specific signal sequence is received from a second radio device providing a same MTC service as the first radio device after the attach request was received from the first radio device, transmitting the first attach request stored in the memory to the higher-level network node without waiting for reception of a second attach request from the second radio device.

* * * * *